US006816820B1

(12) United States Patent
Friedl et al.

(10) Patent No.: US 6,816,820 B1
(45) Date of Patent: Nov. 9, 2004

(54) METHOD AND APPARATUS FOR MODELING INJECTION OF A FLUID IN A MOLD CAVITY

(75) Inventors: Christian Friedl, Ringwood East (AU); Franco Stephen Costa, Preston (AU); Peter Shane Cook, Forest Hill (AU); Kapil Talwar, Carlton (AU); Leonid K. Antanovskii, Ithaca, NY (US)

(73) Assignee: Moldflow Ireland, Ltd., Blackrock (IE)

( * ) Notice: Subject to any disclaimer, the term of this patent is extended or adjusted under 35 U.S.C. 154(b) by 0 days.

(21) Appl. No.: 09/404,932

(22) Filed: Sep. 24, 1999

(51) Int. Cl.[7] .............................................. G06F 17/10
(52) U.S. Cl. ............................................. 703/2; 703/9
(58) Field of Search .................... 703/2, 9, 6; 264/279, 264/338; 374/136; 428/64; 606/9; 700/204, 197, 146; 425/145; 716/20

(56) References Cited

U.S. PATENT DOCUMENTS

| | | | |
|---|---|---|---|
| 3,977,255 A | 8/1976 | Groleau et al. | ........... 73/432 R |
| 4,387,655 A | 6/1983 | Chaiken | ...................... 110/347 |
| 4,504,920 A | 3/1985 | Mickowski | .................. 364/550 |

(List continued on next page.)

FOREIGN PATENT DOCUMENTS

| | | | |
|---|---|---|---|
| AU | A-27152/95 | 2/1996 | |
| EP | 0 525 198 A1 | 2/1993 | |
| EP | 0 698 467 A1 | 2/1996 | |
| EP | 0 747 198 A2 | 12/1996 | ........... B29C/45/76 |
| JP | 4305424 | 10/1992 | |
| JP | 4331125 | 11/1992 | |
| JP | 7125034 | 5/1995 | |
| JP | 08230007 | 9/1996 | ........... B29C/45/76 |

OTHER PUBLICATIONS

Mori et al., "Simplified three dimensional simulation of non–isothermal filling in metal injection moulding by finite element method", Engineering computations, 1996.*

Ding et al., "Finite element simulation of an injection moulding process", International journal of numerical methods for heat and fluid flow, 1997.*

K. Talwar et al., "Three Dimensional Simulation of Plastic Injection Molding," Moldflow Pty. Ltd., 6 pgs. (1998).

K. Talwar et al., "Three Dimensional Simulation of Plastic Injection Molding," Moldflow Pty. Ltd., Michigan, 9 pgs. (1998).

S. Ray et al., "Incorporation of Viscoelastic Contitutive Equations in the Injection Molding Process," Industrial Research Institute Swinburne and Moldflow Pty. Ltd., Cairns, Australia, 10 pgs. (Sep. 1997).

(List continued on next page.)

Primary Examiner—Kevin J. Teska
Assistant Examiner—Kandasamy Thangavelu
(74) Attorney, Agent, or Firm—Testa, Hurwitz & Thibeault, LLP

(57) ABSTRACT

The invention relates to a method and apparatus for analyzing fluid flow while considering heat transfer effects and, in particular, a phase change from a molten state to a solid state. In particular, the method and apparatus may be applied to the analysis of an injection molding process for producing a molded polymer component from a thermoplastic or a thermosetting polymer. In one embodiment, the method may be used to determine pressure required to fill a mold cavity and pressure gradients introduced during filling and packing of the cavity of an injection mold. The results of these analyses may be used to determine the number and location of gates, to determine the best material for the component, and to optimize the process conditions used in the molding process.

24 Claims, 29 Drawing Sheets

U.S. PATENT DOCUMENTS

| | | | |
|---|---|---|---|
| 4,534,003 A | | 8/1985 | Manzione .................... 364/476 |
| 4,641,270 A | | 2/1987 | Lalloz et al. ............... 364/476 |
| 4,676,664 A | * | 6/1987 | Anderson et al. ........... 374/136 |
| 4,868,751 A | | 9/1989 | Dogru et al. ............... 364/422 |
| 4,989,166 A | | 1/1991 | Akasaka et al. ............ 364/578 |
| 5,031,108 A | | 7/1991 | Fujita et al. ................. 364/476 |
| 5,031,127 A | | 7/1991 | Fujita et al. ................. 364/476 |
| 5,035,598 A | | 7/1991 | Fujita et al. ................. 425/144 |
| 5,072,782 A | | 12/1991 | Namba et al. ................ 164/45 |
| 5,097,431 A | | 3/1992 | Harada et al. ............. 364/578 |
| 5,097,432 A | | 3/1992 | Harada et al. ............. 364/578 |
| 5,146,086 A | | 9/1992 | De et al. .................... 250/253 |
| 5,311,932 A | * | 5/1994 | Sen et al. ................ 165/109.1 |
| 5,350,547 A | | 9/1994 | Yamaguchi et al. ....... 264/40.1 |
| 5,377,119 A | | 12/1994 | Backer et al. .............. 364/476 |
| 5,408,638 A | * | 4/1995 | Sagawa et al. ................ 716/20 |
| 5,549,857 A | | 8/1996 | Kamiguchi et al. ........ 264/40.1 |
| 5,572,434 A | | 11/1996 | Wang et al. ........... 364/475.02 |
| 5,581,468 A | | 12/1996 | White et al. ........... 364/475.09 |
| 5,811,133 A | | 9/1998 | Saito et al. ................. 425/145 |
| 5,812,402 A | | 9/1998 | Nishiyama et al. .... 364/468.03 |
| 5,835,379 A | | 11/1998 | Nakano ................. 364/475.02 |
| 5,989,473 A | * | 11/1999 | Haverty ....................... 264/279 |
| 6,021,270 A | | 2/2000 | Hanaki et al. ......... 395/500.28 |
| 6,077,472 A | * | 6/2000 | Kataoka et al. ............. 264/338 |
| 6,089,744 A | * | 7/2000 | Chen et al. .................... 703/2 |
| 6,096,088 A | | 8/2000 | Yu et al. ........................ 703/9 |
| 6,161,057 A | | 12/2000 | Nakano ...................... 700/197 |
| 6,180,201 B1 | * | 1/2001 | Sandstrom ................. 428/64.1 |
| 6,192,327 B1 | | 2/2001 | Nishiyama et al. ............. 703/2 |
| 6,248,103 B1 | * | 6/2001 | Tannenbaum et al. ......... 606/9 |
| 6,327,553 B1 | | 12/2001 | Nishiyama et al. ............ 703/2 |

OTHER PUBLICATIONS

S. Ray et al., "Three Dimensional Simulation of Viscoelastic Constitutive Equations Using a Segregated Finite Element Scheme," Industrial Research Institute Swinburne and Moldflow Pty. Ltd., Adelaide, Australia, 4 pgs. (Jul. 1998).

K. Talwar et al., "Three Dimensional Mould Filling Simulation Using a Segregated Finite Element Scheme," Moldflow Inc., Cairns, Australia, 11 pgs. (Sep. 1997).

P. Brincat et al., "Contraction Pressure Loss; Influence of Temperature and Fibre Reinforcement," Swinburne University of Technology, Moldflow Pty. Ltd., and Sunkyong Industries, Sorrento, Italy, 2 pgs. (1996).

F. Costa et al., "An Adaptation of the Boundary Element Method for Modeling Gas Injection Molding," *Simulation of Materials Processing: Theory, Methods and Applications*, Rotterdam, The Netherlands, pp. 1113–1118, (1995).

F. Costa et al., "Gas Injection Molding Simulation By the Boundary Element Method," Swinburne University of Technology and Moldflow Pty. Ltd., Melbourne, Australia, 11 pgs. (1994).

J.G. Rice et al., "An Equal–Order Velocity–Pressure Formulation That Does Not Exhibit Spurious Pressure Modes," *Computer Methods in Applied Mechanics and Engineering*, vol. 58, pp. 135–149 (1986).

A.N. Brooks et al., "Streamline Upwind/Petrov–Galerkin Formulations for Convection Dominated Flows with Particular Emphasis on the Incompressible Navier–Stokes Equations," *Computer Methods in Applied Mechanics and Engineering*, vol. 32, pp. 199–258, (1982).

H. Yokoi et al., "Measurement of Melt Temperature Profiles During Filling and Packing Processes Using a New Integrated Thermocouple Sensor," University of Tokyo and Yamaha Motor Co., Ltd., 7 pgs. (1992).

C.W. Hirt et al., "Volume of Fluid (VOF) Method for the Dynamics of Free Boundaries," Journal of Computational Physics, vol. 39, pp. 201–225, (1981).

Y. Saad et al., "GMRES: A Generalized Minimal Residual Algorithm for Solving Nonsymmetric Linear Systems," Siam J. Sci. Stat. Comput., vol. 7, No. 3, pp. 856–869, (Jul. 1986).

C. Herber et al. "A Finite–Element/Finite–Difference Simulation of the Injection–Molding Filling Process," *Journal of Non–Newtonian Fluid Mechanics*, vol. 7, pp. 1, 3–6 (1980).

"Moldflow Design Principles," Moldflow Corporation, pp. cover, i–vi, 1–55 (1984).

K. Bathe, "Finite Element Procedures in Engineering Analysis," pp. 407–428 (1982).

J. Daily et al., "Fluid Dynamics," pp. 164–165, 180–185 (1966).

L. Prandtl, "Essential of Fluid Dynamics," pp. 150–151 (1967).

H. Wang et al., "Numerical Techniques for Free and Moving Boundary Problems," *Fundamentals of Computer Modeling for Polymer Processing*, C. Tucker, ed., Chapter 8, pp. 375–377 (1989).

J. Slattery, "Momentum, Energy, and Mass Transfer in Continua," pp. 98–99 (1972).

V. Voller et al., "An Algorithm for Analysis of Polymer Filling of Molds," *Polymer Engineering and Science*, vol. 35, No. 22, pp. 1758–1765 (Nov. 1995).

W. Young et al., "Analysis of Resin Injection Molding in Molds with Preplaced Fiber Mats," *Polymer Composites*, vol. 12, No. 1, pp. 30–38, (Feb. 1991).

K. Talwar et al., "Three–dimensional Simulation of Polymer Injection Molding: Verification," Moldflow International Pty. Ltd., Seoul, Korea, pp. 51–58, (Jul. 1998).

C. Friedl, "Progress Towards True 3D CAE Analysis for Injection Molding," Moldflow Pty. Ltd., 5 pgs. (1996).

V. Rajupalem et al., "Three–Dimensional Simulation Of The Injection Molding Process," Moldflow Pty. Ltd., 4 pgs. (1997).

J.P. Holman, "Heat Transfer," McGraw–Hill, Singapore, pp. 136–139, (1989).

S. Guceri, "Finite Difference Solution of Field Problems," *Fundamentals of Computer Modeling of Polymer Processing*, C. Tucker, ed., Chapter 5, pp. 198–199 (1989).

"Getting Started with MF/Flow3D," Release 1.0.0, Moldflow Corporation, pp. i, ii, 1–84, (Sep. 1998).

"Installation Guide for Moldflow Plastics Insight," Release 1.0.1, Moldflow Corporation, pp. i, 1–73, (Jun. 1999).

"Getting Started with Moldflow Plastics Insight," Moldflow Corporation, pp. i, ii, 1–91, (Jun. 1999).

H. Begehr et al., "Non–Newtonian Hele–Shaw flows In n $\geqq$ 2 Dimensions," *Nonlinear Analysis, Theory, Methods & Applications*, vol. 11, No. 1, Great Britain, pp. 17–18 (1987).

H. Begehr et al., "Hele–Shaw Type flows in $R^n$," *Nonlinear Analysis, Theory, Methods & Applications*, vol. 10, No. 1, Great Britain, pp. 65–66 (1986).

P. Kennedy, "Flow Analysis of Injection Molds," Germany, entire book, (1995).

J.–F. Hétu et al., "Three–dimensional Finite Element Simulation of Mold Filling Processes," *Simulation of Materials Processing: Theory, Methods and Applications*, Rotterdam, Netherlands, pp. 1135–1140 (1995).

* cited by examiner i = TARGET NODE
j = UPSTREAM POINT
$k_0, k_1, k_2$ = NODES OF ELEMENT CONTAINING THE UPSTREAM POINT
$(d_0, t_0)(d_1, t_1)(d_2, t_2)$ ARE THE DISTANCE TO THE WALL AND NODE THERMAL
   CLOCK TIMES FOR EACH UPSTREAM NODE RESPECTIVELY
$\bar{d}_j$ = INTERPOLATED DISTANCE TO THE WALL OF THE UPSTREAM POINT $T_j$ = INTERPOLATION OF $T_0(\bar{d}_j, t_0)$,
$T_1(\bar{d}_j, t_1)$,
$T_2(\bar{d}_j, t_2)$,

FOR A FACE WITH ONE EDGE REFINED:

FOR A FACE WITH TWO EDGES REFINED:
WHERE A < B

A          B

FOR A FACE WITH ALL THREE EDGES REFINED

TEMPLATE FOR SPLITTING A TET ON:

1 EDGE:

TEMPLATE FOR SPLITTING A TET ON

2 EDGES

NOTE THAT THERE IS A TEMPLATE FOR SPLITTING THE
FOUR-SIDED BASE PYRAMID

THIS RESULTS IN:

AS A CLOSED GROUP WITH NEW EDGES MARK

TEMPLATE FOR SPLITTING A "FOUR-SIDED BASE" PYRAMID

INTO TWO TETS

TEMPLATE FOR SPLITTING A TET ON

2 EDGES (OPPOSITE)

THE FINAL COMPACT RESULT WILL BE:

TEMPLATE FOR SPLITTING A TET ON:

3 EDGES (SHARED FACE)

IN CLOSED FORM

TEMPLATE FOR SPLITTING A TET ON:

3 EDGES (NON-SHARED FACE)

THE FINAL RESULT WILL BE:

TEMPLATE FOR SPLITTING A TRIANGULAR PRISM

THEREFORE THE FINAL RESULT WOULD BE:

TEMPLATE FOR SPLITTING A TET ON

3 EDGES (IN SERIES)
NON FACE, NON SHARED POINT

* IF B OR C ARE THE LOWEST NODE NUMBER (PICTURE FOR B)

SINGLE EDGE TEMPLATE    DOUBLE EDGE TEMPLATE

FINAL RESULT     ALL FACES ARE EITHER

* IF A OR D ARE THE LOWEST NODE MEMBER

THESE TWO BODIES CAN BE FURTHER SPLIT BY THE SINGLE EDGE TEMPLATE

FINAL RESULT

TEMPLATE FOR SPLITTING A TET ON
4 EDGES (OPPOSITE EDGES)

THE EVENTUAL SPLIT BODY IN CLOSED FORM

THE PATTERN ON EACH ORIGINAL TRIANGLE FACE IS:

TEMPLATE FOR SPLITTING A TET ON

4 EDGES (ADJACENT EDGES)

THE COMPACTED ORIGINAL TET IS:

FACES APPEAR AS

TEMPLATE FOR SPLITTING A TET ON:

5 EDGES

THE FINAL COMPACTED RESULT IS:

TEMPLATE FOR SPLITTING A TET ON

6 EDGES

THE RESULTING COMPACTED BODY IS:

ALL FACES HAVE THE
FOLLOW SPLIT PATTERN

METHOD AND APPARATUS FOR MODELING INJECTION OF A FLUID IN A MOLD CAVITY

TECHNICAL FIELD

The invention relates to the field of three dimensional modeling of fluid flow in a cavity and, more specifically in one embodiment, to the modeling of an injection molding process for producing molded polymer components.

BACKGROUND

The use of injection molded plastic components has dramatically increased in many industries in recent years. Manufacturers of electronic equipment, consumer goods, medical equipment, and automotive parts are producing more and more of their products and components used in their products out of plastics than ever before. At the same time, competitive pressures are driving manufacturers in the plastics injection molding industry to find new methods to optimize the designs in order to better match the designs to the production process. When the need for component or mold configuration modifications are discovered late in the design development process, the delay and associated costs to implement the necessary changes rise rapidly. Companies that want to ensure that their components are producible and will perform optimally have begun to use computer aided engineering techniques to simulate or model the complex flows in an injection mold, in order to understand better the manufacturing process and integrate this knowledge into component design, early in the design phase.

There are a number of factors that should be considered when designing an injection mold and the component which is to be produced therein. Parameters such as the overall component geometry, minimum and maximum wall thicknesses, number and location of gates in the mold through which the liquid polymer is injected, number and location of vents in the mold through which gas in the cavity escapes, polymer composition and properties, and shrinkage allowances, are a few. Due to the closely interrelated relationship, component and mold design cannot reliably be based purely on form and function of the end component, but should also consider the effects of the manufacturing process.

Computer aided engineering simulation can be used advantageously to provide design and manufacturing engineers with visual and numerical feedback as to what is likely to happen inside the mold cavity during the injection molding process, allowing them to better understand and predict the behavior of contemplated component designs so that the traditional, costly trial and error approach to manufacturing can be eliminated substantially. The use of computer aided engineering simulation facilitates optimizing component designs, mold designs, and manufacturing processing parameters during the design phase, where necessary changes can be implemented readily, with the least cost and impact on schedule.

A basic discussion of the injection molding process and the challenges associated with producing high yield, quality injection molded components is addressed in the primer "Moldflow Design Principles: Quality and Productivity by Design," distributed by Moldflow Pty. Ltd., Kilsyth, Victoria, Australia, the assignee of the instant patent application, the disclosure of which is herein incorporated by reference in its entirety.

Briefly, the injection molding process is a complex, two step process. In the first step, referred to as the filling phase, polymer material is forced under pressure into the mold cavity until the cavity is volumetrically filled. Thereafter, in the second step, referred to as the packing phase, pressure is maintained on the polymer to permit further flow of polymer into the cavity to compensate for shrinkage as the material solidifies and contracts. When the component is sufficiently solid, the component may be ejected from the mold. Both thermoplastic and thermosetting polymers can be injection molded.

When molding thermoplastics, the temperature of the mold at the cavity surface or wall is maintained at a temperature below the melting temperature of the material to be injected. As the material flows into the cavity, the liquid material forms a solidified layer along the cavity wall. This layer may be referred to as the frozen layer and, depending on the processing conditions and the material used, the thickness thereof may vary during filling. The thickness of the frozen layer is important, because the frozen layer reduces the effective channel width for flow in the cavity and, due to the thermo-rheological characteristics of thermoplastics, typically effects the viscosity of the material flowing thereby.

Early analytical simulation techniques relied upon two dimensional finite element models, which were found to be beneficial for simulating injection molding of relatively simple, thin-walled components. More advanced simulation techniques are discussed, for example, in International Patent Application No. PCT/AU98/00130, assigned to the assignee of the instant invention, the disclosure of which is incorporated herein by reference in its entirety. In thick or complex components, however, where molten plastic can flow in all directions, traditional thin-wall analytic assumptions that rely on planar regions of specified thickness are not capable typically of predicting this type of flow. To achieve high accuracy and predictability, a full, three dimensional simulation is desirable to establish, for example, where weld lines will form, air traps will occur, and flow will lead or lag.

In order to analyze in three dimensions injection molded component designs, it is generally desirable to start with a computerized solid modeling package, such as Pro-Engineer™, CATIA™, I-DEAS™, Solid Works™, Solid Edge™, or other, which is used commonly in mechanical design and drafting applications. The modeling package can be used to generate three dimensional, photorealistic descriptions of the component geometry, called a solid model. At present, finite element analysis codes based directly on solid models use nodes to define solid elements such as tetrahedra and hexahedra. In order to account for the physics involved in injection molding, it is generally desirable to calculate five quantities per node of the finite element model, namely pressure, three orthogonal components of velocity, and temperature. Given that a suitable model may contain hundreds of thousands of nodes, solution of such complex numerical problems is difficult and requires substantial computer resources.

U.S. Pat. No. 5,835,379, issued to Nakano, and related European Patent Application No. EP 0 698 467 A1, the disclosures of which are incorporated herein by reference in their entirety, suggest a method to reduce the number of variables to be determined in an injection molding finite element model during the filling phase in order to permit calculation using lower computer resources than would be required otherwise. Nakano discusses the concept of flow conductance, κ, to reduce the number of variables to two, namely pressure and flow conductance. As used herein, the terms flow conductance, fluid conductance, and fluidity are used interchangeably and are to be considered synonymous. The effect of varying material viscosity is incorporated into the calculation via the flow conductance variable. This necessarily involves the extrapolation of viscosity data and it is contemplated that this leads to considerable error in the calculation of viscosity. Also, during the filling and packing phases, the material proximate the cavity walls begins to freeze and the thickness of the layer increases with time until the part is ejected, which is thought to lead to additional error when applying the method of Nakano.

The viscosity, $\eta$, of a polymer melt is frequently measured as a function of temperature and shear rate. When making a measurement, it is not possible to measure the viscosity at low temperatures approaching the temperature where the material solidifies, because at these low temperatures, the viscosity is relatively high and, at reasonable shear rates, we have discovered that thermal viscous dissipation is significant. Accordingly, viscosity measurements are taken generally in the range of temperatures at which the melt flows substantially readily. After measurement, a function is fitted to the measured data. The available data fitting functions are generally reasonable at high temperatures and hold over a wide range of shear; however, when considering material at the wall that is below or near the solidification temperature, it is necessary to extrapolate the viscosity well beyond the experimental range. This results in errors in the viscosity value, which in turn creates error in the flow conductance, because viscosity and flow conductance are related by the following relationship:

$$\nabla^2 \kappa = -\frac{1}{\eta} \qquad (1)$$

which can also be represented in the form:

$$\nabla \cdot (\eta \nabla \kappa) = -1 \qquad (2)$$

Also, as noted by Nakano, the value of the flow conductance has a small value at the cavity wall and increases with distance away from the wall. At the wall, the value of flow conductance is close to or equal to zero, because of the very high viscosity there. A common velocity boundary condition in fluid flow is a zero velocity at the wall. This equates to a no-slip condition. When slip occurs, velocity at the wall is non-zero, and can be treated in several ways. Using the flow conductance approach, the flow conductance can be set to a small, non-zero value. Nevertheless, as a result, there are, in actuality, variations of flow conductance in the frozen layer which are orders of magnitude less than in the melt. Such a wide variance in values leads to errors in the numerical scheme of Nakano and others in calculating flow conductance.

During the packing phase, the values of pressure may also be obtained by solving first for flow conductance. In packing, we have determined that the frozen layer becomes very significant, to the extent that eventually the majority of nodes are below the solidification temperature. Hence, the problems alluded to above are exaggerated in the packing phase.

SUMMARY OF THE INVENTION

Conventional three dimensional modeling techniques rely primarily on the underlying laws of conservation of mass and conservation of momentum to predict fluid flow in an injection mold cavity. However, in order to achieve high accuracy and high predictability in a full, three dimensional simulation of the injection molding process, we have determined conservation of energy principles should be addressed as well. In order to satisfy all three requirements simultaneously, without consuming inordinate computational resources, creative methods have been developed in accordance with the invention, based upon a variety of new modeling assumptions and methodologies.

Accordingly, it is one object of the invention to employ conservation of energy principles in modeling fluid flow in a cavity. The fluid may be a viscous liquid, such as a polymer melt in an injection molding process, or a molten or semi-solid metal used in a casting process. Because the material also experiences a phase change from the liquid state to a solid state, considering the thermal effects underlying the conservation of energy principles both during initial flow and solidification have been found to be important.

For example, it has been recognized that during the filling and packing phases, there are three primary heat transfer mechanisms to consider: convection from the incoming melt, conduction out to the mold wall, and viscous dissipation, which is related to the thermal energy produced by shearing within the flowing polymer. Additionally, there may be other mechanisms, such as compressive heating effects, due to heat generated by compression and cooling resulting from decompression. All three primary mechanisms contribute significantly to the energy balance during filling. Accordingly, accurate simulation of injection molding requires typically non-isothermal analysis of the molten polymer as it flows into the mold. During the packing phase, however, the flow of material is reduced significantly and the main heat transfer mechanisms are conduction to the mold wall and convection of melt from regions of high pressure to regions of lower pressure. Convection functions quite strongly in the earliest stages of packing, when pressure is first applied. Note also that packing pressures can be lower or higher than the fill pressure, and can be profiled, that is they can be made to change with time. Consequently material can flow into the mold and also out of the mold via the feed system, depending on the difference between the pressure in the cavity and the applied pressure at the feed system. Analysis of the packing phase also typically requires that the melt be considered as a compressible fluid.

While conventional methods determine flow conductance at a plurality of small elements that divide the region in which fluid flows, according to one embodiment of the present invention, flow conductance is calculated at each of the nodes of each element. This technique allows a more precise value of the flow conductance to be defined, as the flow conductance may vary in any of a variety of desired fashions from node to node. The variation will depend on the type of finite element used to discretize the problem. Use of a nodal value is more desirable than use of an elemental value, as other quantities such as temperature, pressure, and velocity are more precisely defined as point values and, again, may be interpolated from node to node in any fashion. This interpolation capability also enables the location of the interface between the solid and molten polymer to be accurately determined, which has been found to be particularly relevant in simulation predictive accuracy.

Accordingly, it is an object of the invention to use a one dimensional analytic function to describe the local temperature distribution at a node. It is another object of the invention to define the variation of a one dimensional analytic function, with time, to account for heat convection. It is yet another object of the invention to define the variation of a one dimensional analytic function to account for viscous heat generation. It is still another object of the invention to define an explicit temperature convection scheme using the one dimensional analytic function. And it is a further object of the invention to provide anisotropic finite element mesh refinement, including a distance to the cavity wall computation algorithm.

Moreover, according to one embodiment, the present invention incorporates the concept of a frozen layer to remedy certain of the problems with respect to conventional simulation techniques mentioned above. A criterion is used to define the interface between the molten polymer and the solidified polymer at the mold cavity wall. This criterion may be a temperature, a minimum value of velocity, a combination of the two, or some other physical quantity. In the frozen region, there is no significant movement of polymer and so it is not necessary to calculate the flow conductance there. Nodes that are determined to be in the frozen region can be removed from the solution process for velocity, pressure, and fluid conductance. Only temperature need be calculated in the frozen layer. Note, however, that properties other than temperature can also be computed in the frozen layer. For example, the material morphology will change with change in state. Crystallinity of semi-crystalline polymers changes with temperature, and crystals can only be said to form once the melt has cooled sufficiently from the melt state. The state of stress also depends on temperature and differs between liquid and solid phases. Polymers are viscoelastic, so their stress state, even in the solid, changes with time and temperature.

In effect, by only calculating temperature, this reduces the number of variables to be determined to one in the frozen layer and thereby dramatically increases the speed of computation, while reducing the memory required. By removing the frozen nodes, the need for extrapolation of the viscosity is removed and so the errors associated therewith are removed as well. Further, by removing nodes in the frozen layer from the analysis, very small values of flow conductance are removed and the equations to be solved are better conditioned than in conventional methods. Still further, by not calculating fluid conductance in these regions, it has been found that not only is the problem size reduced considerably, but the stability of numerical methods is improved as well.

Accordingly, it is another object of the invention to determine the position of the solid/liquid interface in the mold cavity and within elements defined in the mesh. It is still another object of the invention to develop a formulation of elements with a linear variation of material properties throughout. It is yet another object of the invention to determine an effective viscosity function in elements containing the solid/liquid interface. It is a further object of the invention to eliminate frozen nodes and elements from the solution domain. And it is yet a further object of the invention to compute the effective pressure in regions that have solidified.

One embodiment of the invention involves a method for modeling injection of a fluid into a mold defining a three dimensional cavity, the method including the steps of providing a three dimensional solid computer model defining the cavity, discretizing a solution domain based on the solid model, specifying boundary conditions, solving for filling phase process variables using conservation of mass, momentum, and energy to provide respective filling solutions for at least the portion of the solution domain, then solving for packing phase process variables in a similar manner to provide respective packing phase solutions for at least the portion of the solution domain, and determining whether the filling and packing phase solutions are acceptable. The filling and packing phase process variables can include density, fluidity, mold cavity fill time, mold cavity packing time, pressure, shear rate, shear stress, temperature, velocity, viscosity, and volumetric shrinkage. In the event the filling and/or packing phase solutions are unacceptable the boundary conditions and or discretized solution domain can be modified and the analysis repeated until an acceptable result is achieved. To facilitate a user in determining whether the results are acceptable, a variety of filling and packing phase solutions can be displayed graphically, such as fill time, packing time, density, pressure, shear rate, shear stress, temperature, velocity, viscosity, and volumetric shrinkage.

Another embodiment of the invention involves a method for modeling injection of a fluid into a mold defining a three dimensional cavity including the steps of providing a three dimensional solid computer model defining the cavity, discretizing a solution domain based on the solid model, specifying boundary conditions, solving for filling phase process variables using conservation of mass, momentum, and energy to provide filling phase solutions for at least some of the portion of the solution domain, and determining whether the solutions are acceptable for injection of the fluid during filling of the mold cavity.

The discretizing step may include the substep of generating a finite element mesh based on the solid model by subdividing the model into a plurality of connected elements defined by a plurality of nodes. The mesh generating substep may include generating an anisotropic mesh in thick and thin zones of the model, such that mesh refinement it provides increased resolution in a thickness direction without increasing substantially mesh refinement in a longitudinal direction.

The boundary conditions may include such parameters as fluid composition, fluid injection location, fluid injection temperature, fluid injection pressure, fluid injection volumetric flow rate, mold temperature, cavity dimensions, cavity configuration, and mold parting plane, and variations thereof.

Solving for the filling phase process variables may include the substeps of solving for fluidity, pressure, velocity, and viscosity for at least some of the solution domain, where viscosity is based on temperature. Temperature, in turn, may be based on convective, conductive, and/or viscous dissipation heat transfer contributions. Velocity and/or viscosity may be calculated iteratively, until pressure converges.

This method may also include the substep of determining free surface evolution of the fluid in the cavity based on velocity in a given time increment, wherein the free surface evolution is determined iteratively, until the cavity is filled.

Once the simulation has modeled that the cavity is filled, the method may then solve for packing phase process variables using conservation of mass, momentum, and energy for at least a portion of the solution domain based on respective states of the process variables at termination of filling, to provide respective packing phase solutions for at least some of the solution domain. A determination can then be made whether the packing phase solutions are acceptable for injection of the fluid during packing of the mold cavity.

Again, solving for packing phase process variables can include solving for fluidity, pressure, velocity, and viscosity for at least some of the solution domain, where viscosity is based on temperature. Temperature, in turn, may be based on convective, conductive, and/or viscous dissipation heat transfer contributions. Velocity and/or viscosity may be calculated iteratively, until pressure converges. The mass properties of a component produced in accordance with the boundary conditions can also be determined. The mass properties may include component density, volumetric shrinkage, component mass, and component volume and may also be calculated iteratively, along with velocity and viscosity, until a predetermined pressure profile is completed.

BRIEF DESCRIPTION OF THE DRAWINGS

The novel features believed characteristic of the invention are set forth and differentiated in the appended claims. The invention, in accordance with preferred and exemplary embodiments, together with further advantages thereof, is more particularly described in the following detailed description taken in conjunction with the accompanying drawings in which:

DETAILED DESCRIPTION OF THE INVENTION

Figure 1:
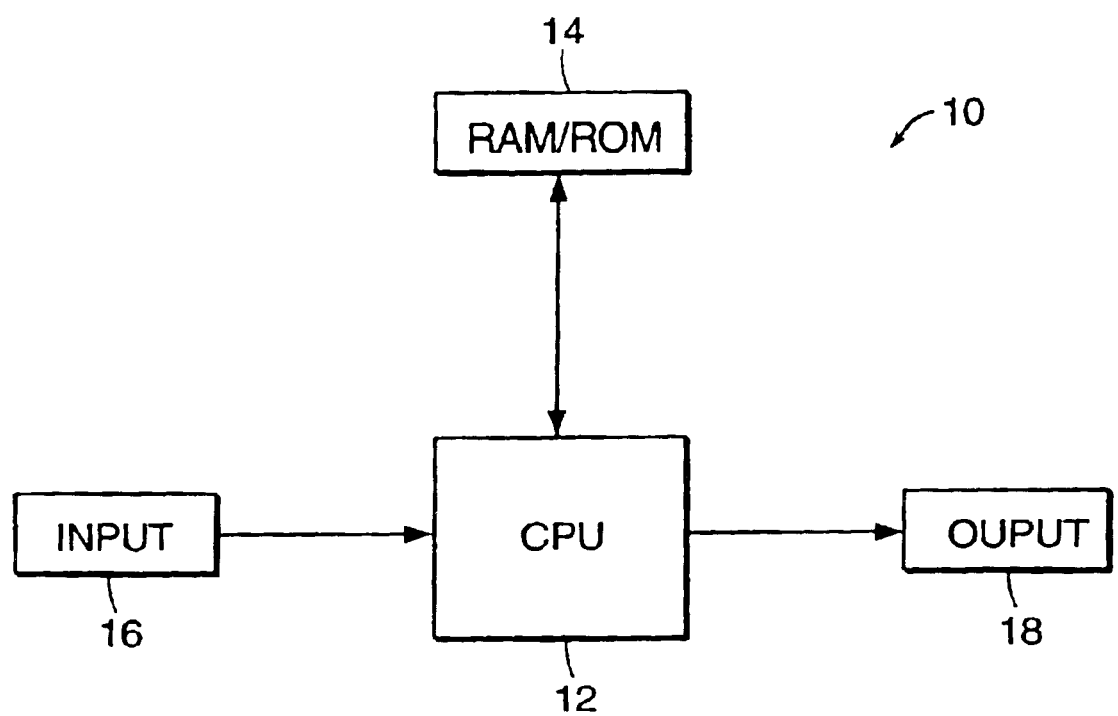
FIG. 1 is a schematic representation of computer hardware apparatus suitable for use with the disclosed methods for modeling injection of fluid in a mold cavity in accordance with one embodiment of the present invention.

Modeling of the injection molding process in a three dimensional simulation can be described by the conservation equations for mass, momentum, and energy, respectively, as follows:

$$\frac{\partial \rho}{\partial t} + \nabla \cdot (\rho \vec{v}) = 0 \quad (3)$$

where ρ is density, v is velocity, t is time, ∇ stands for the gradient with respect to a position vector, and → denotes a vector quantity.

$$\rho\left(\frac{\partial \vec{v}}{\partial t} + \vec{v} \cdot \nabla \vec{v}\right) + \nabla \cdot P = \rho \vec{g} \quad (4)$$

where P is the momentum flux and g is the gravity force.

$$\rho\left(\frac{\partial \hat{U}}{\partial t} + \vec{v} \cdot \nabla \hat{U}\right) + P:D + \nabla \cdot \vec{q} = \rho Q \quad (5)$$

where U is specific internal energy, D is the deformation rate tensor, q is heat flux, and Q is the specific heat rate which signifies other heat sources or sinks.

Equation 4 is commonly expressed in terms of temperature and pressure, and for the case in which Q=0, i.e. no additional heat sources or sinks, typical for thermoplastics, takes the form, $$\rho C_p \left( \frac{\partial T}{\partial t} + \vec{v} \cdot \nabla T \right) + \frac{T}{\rho} \frac{\partial \rho}{\partial T} \left( \frac{\partial p}{\partial t} + \vec{v} \cdot \nabla p \right) = \eta \dot{\gamma}^2 + \nabla \cdot (\kappa \nabla T) \quad (6)$$

where $C_p$ is specific heat, T is temperature, p is pressure, $\eta$ is viscosity $\dot{\gamma}$ is shear rate, and $\kappa$ is thermal conductivity. This $\kappa$ should not be confused with flow conductance.

In general, these equations are analytically intractable, so they are solved by a discrete numerical procedure, such as a boundary element method, a finite element method, a finite difference method, a finite volume method, or a meshless method. According to the finite element method, solution requires subdivision of the solution domain into a set of smaller sub-domains, and transformation of the equations into a set of discrete equations describing the ensemble of the smaller sub-domains. Application of the finite element method to a three dimensional domain results in three dimensional sub-domains called elements. According to one method, four node, linear tetrahedral elements may be used, wherein the elements are defined by nodes at the vertices of each tetrahedral element, and the term linear refers to the polynomial order of the element interpolation or shape functions.

Most common finite element practice results in a discretization of the domain, such that the field variables of interest are computed at the node points, and the material properties required for analysis are constant within an element. To improve accuracy, especially in high gradient regions, it has been determined to be desirable to formulate the equations such that both the field variables (such as pressure, temperature, and velocity) and the material properties (such as viscosity) are defined at the nodes and are, unless otherwise stated, interpolated within an element according to the element shape function. Discretization in this way has been determined to provide not only additional computational accuracy, but also facilitates use of higher order advanced interpolations, to be described more fully hereinbelow.

Ultimately, the accuracy of simulation of a physical process depends strongly on how well the model used in the simulation can describe important phenomena that are characteristic of the process. For injection molding, there are a number of specific phenomena that reflect the complex nature of the process, and which need to be modeled well for accurate predictive simulation results. Among these phenomena are: very large and strongly varying temperature gradients near the solid/liquid interface; variation in position of the solid/liquid interface boundary with time and location in the mold cavity; large variations in polymer material properties at all places and at all times during molding; and increasing volume of solid material with time as the injected liquid material solidifies during molding.

It is possible to capture these specific phenomena in a number of ways. One method is to refine the mesh. This equates to reducing the element size sufficiently to ensure that linear interpolations within neighboring elements can adequately capture rapid spatial changes in the field variables. However, a downside to this approach is that the number of elements and nodes increases enormously, often making the computational cost prohibitive. This applies in particular to injection molding simulation where part dimensions such as thickness and length can differ by two orders of magnitude or more and where the largest spatial gradients of the field variables are found across the smallest spatial dimension, namely the thickness.

An alternative is to use elements with higher order shape functions, such as polynomial functions. Higher order shape functions enable non-linear interpolations of the field variables within an element, with the prospect that fewer elements are required. However, the number of nodes required to define the higher order shape functions within these elements increases and consequently the system of equations is still prohibitively large.

Accordingly, it has been determined that certain modeling functions and assumptions can be employed alone, or in combination, to significantly enhance simulation accuracy, without increasing the number of nodes substantially, with a concomitant detrimental impact on computation time or resources.

Insofar as simulation of the injection molding process entails significant computational effort, depicted in FIG. 1 is a computer hardware apparatus 10 suitable for use with the disclosed methods for modeling injection of fluid in a mold cavity in accordance with this invention. The apparatus 10 may be a portable computer, mini-computer, or other suitable computer having the necessary computational speed and capacity to support the functionality discussed more fully hereinbelow. The computer 10 typically includes one or more central processing units 12 for executing the instructions contained in the software code which embraces the simulation model. Storage 14, such as random access memory and read only memory, is provided for retaining the model code, either temporarily or permanently, as well as other operating software required by the computer 10. Permanent, non-volatile read/write memory such as hard disks are typically used to store the code, both during its use and idle time, and to store data generated by the software. The computer 10 also includes one or more inputs 16, such as a keyboard and disk reader for receiving input such as data and instructions from a user, and one or more outputs 18, such as a monitor or printer for providing simulation results in graphical and other formats. Additionally, communication buses and I/O ports are provide to link all of the components together and permit communication with other computers and computer networks, as desired.

Figure 2:
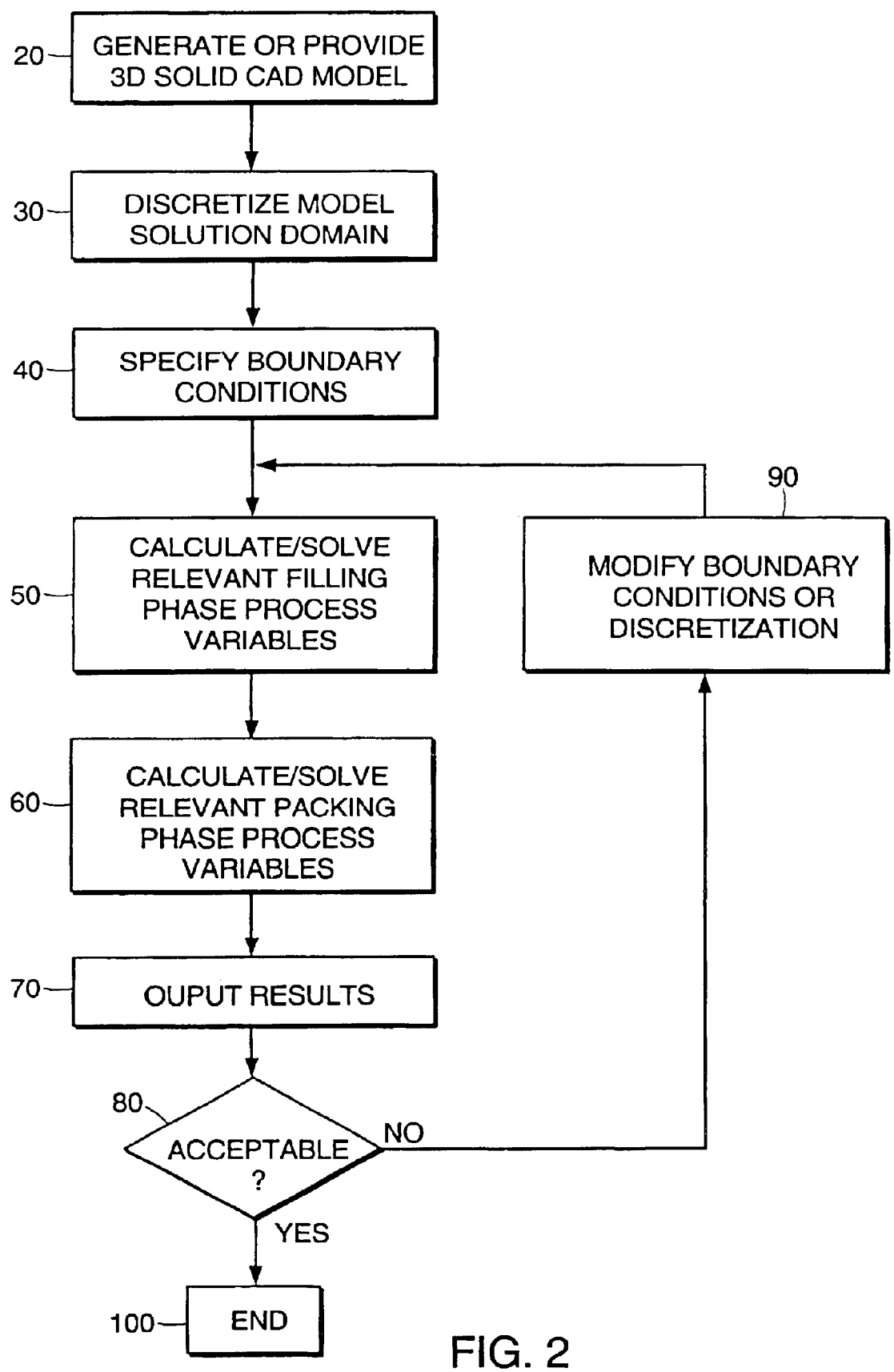
FIG. 2 is a schematic representation of a top level system flowchart summarizing certain process steps in accordance with one embodiment of the present invention.

FIG. 2 is a schematic representation of a highly simplified, top level system flowchart summarizing certain process steps in accordance with one embodiment of the present invention. As a first step 20, a three dimensional solid computer aided design model of the mold cavity is generated or provided, as discussed above. The model solution domain is then defined and discretized by any of a variety of methods, such as by finite element analysis in which a finite element model is produced by generating a finite element mesh based on the solid model in step 30. The mesh consists of a plurality of contiguous solid elements defined by shared nodes. With the resultant finite element model or other discretized solution domain defined, a user specifies boundary conditions in step 40 for the analysis. These boundary conditions, by way of example, may include geometric constraints and numerical values related to fluid composition, fluid injection location, fluid injection temperature, fluid injection pressure, fluid injection volumetric flow rate, mold temperature, cavity dimensions, cavity configuration, mold parting plane, and other initial design data. Moreover, these conditions may not be constant values, but rather time dependent or distributed profiles. For example, injection pressure may vary with time or the mold temperature may be different in different zones, as a result of a prior cooling analysis or active cooling.

Once the boundary conditions have been entered, the computer 10 executes the instructions in accordance with the simulation model to first calculate or solve relevant filling phase process variables for the nodes in step 50. As will be discussed in great detail hereinbelow with respect to the filling phase flowchart depicted in FIG. 24, such variables can include fluidity, mold cavity fill time, pressure, shear rate, stress, velocity, viscosity, and temperature. Also what can be calculated is not limited to these variables; however these are basic variables that can be used to solve other variables included in calculations of such things as crystallization kinetics and fiber orientation distributions. Further, filling can also be solved as a compressible fluid, in which case mass terms included in the packing phase calculations (e.g. density, mass, and volumetric shrinkage) can also be calculated in the filling phase. According to one embodiment, the simulation can be based on the assumption that the fluid is incompressible in the filling phase and compressible in the packing phase. According to another embodiment, it can be assumed that the fluid is compressible in both the filling and packing phases. Also, as will be discussed in further detail below with respect to FIGS. 24 and 25, it is not mandatory to solve for fluidity before pressure, velocity, and viscosity, nor is it necessary to solve for fluidity at all. This is generally only required when a method such as that discussed in Nakano is used to solve the conservation of mass and momentum equations. Conservation of mass and momentum can also be solved using formulations such as Stokes and Navier-Stokes. Accordingly, the principles presented herein have application to all of these descriptions of the physical process such as Nakano, Stokes, and Navier-Stokes.

Once the simulation reaches the stage in the analysis where it is determined that the mold cavity has been filled, the computer 10 executes the instructions in accordance with the simulation model to next calculate or solve relevant packing phase process variables for the nodes in step 60. As will be discussed in great detail hereinbelow with respect to the packing phase flowchart depicted in FIG. 25, such variables can include the mass properties of the component produced in accordance with the simulation model such as density and volumetric shrinkage, in addition to fluidity, packing time, pressure, shear rate, stress, velocity, viscosity, and temperature.

Upon completion of the analysis, the analytical results may be output in step 70 in a variety of manners. For example, the relevant variables may be displayed in a graphics format, overlaying the solid model for visual review by the user, or may be output electronically for further processing or analysis. If the results of the filling phase and the packing phase are deemed to be acceptable in step 80, the simulation terminates in step 100 and the user can proceed to release the design to manufacturing. Because the specified boundary conditions included information related to the configuration of the injection mold and the process parameters, the design can be released for machining of the injection mold and the injection molding process operation sheets generated directly.

If, however, the user determines that the results of the simulation in step 70 are unacceptable or less than optimal, the user has the option in step 90 of modifying one or more of the boundary conditions and/or discretization of the model solution domain and thereafter repeating simulation steps 50 through 70 iteratively, until such time as the user is satisfied with the results. Examples of unacceptable results include analytical instability of the model or process failures such as short shots, wherein the mold cavity is incompletely filled, or generation of excessive temperatures, velocities, or pressures during filling which could degrade component polymer material properties or introduce excessive residual stresses in the components which would adversely effect production yields and could lead to premature component failure. By providing this highly accurate analytical simulation capability early in the design process, significant costs and delays downstream during initial production runs can be avoided.

Figure 24:
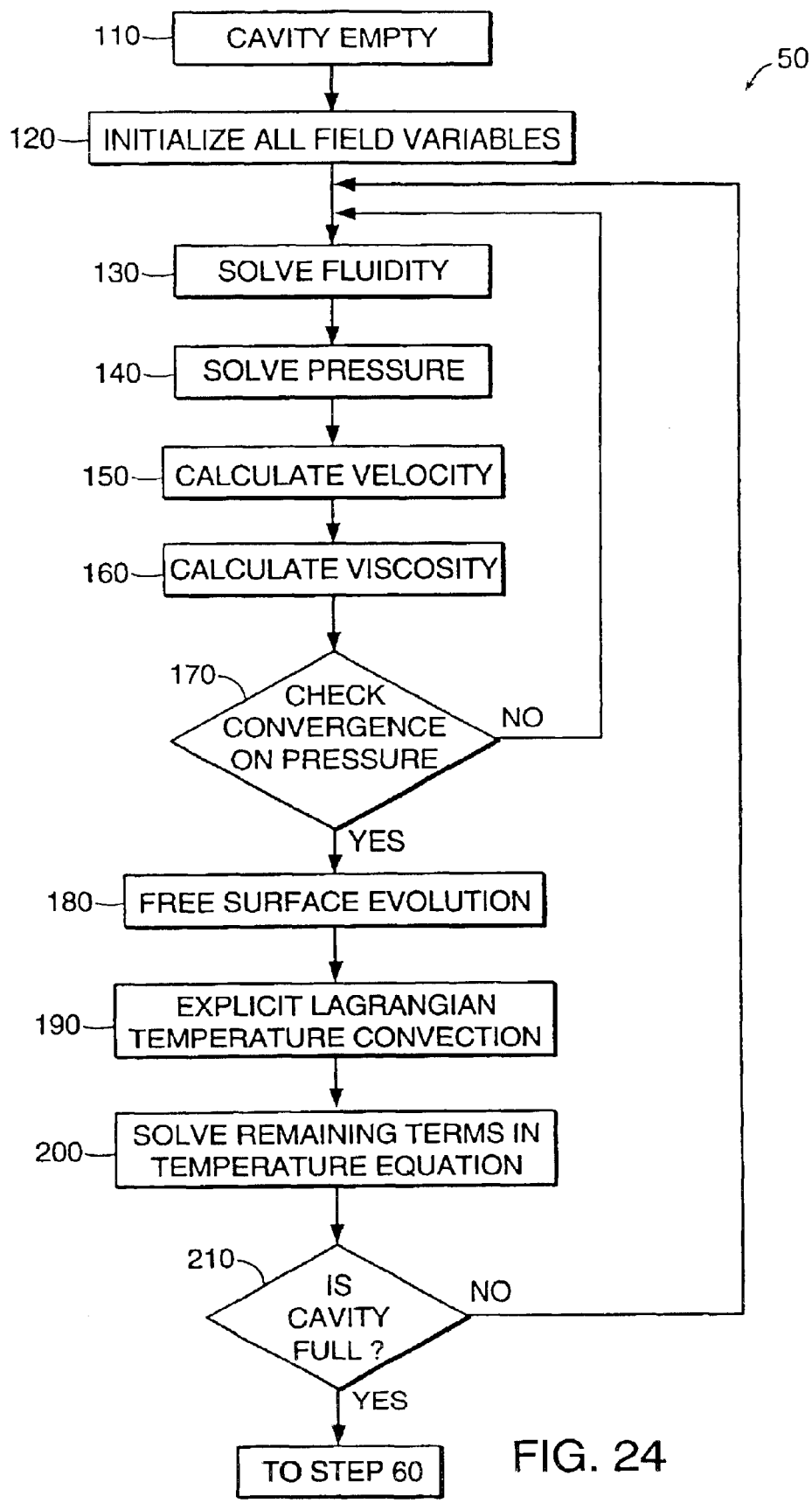
FIG. 24 is a schematic representation of a filling phase flowchart summarizing certain process steps in accordance with one embodiment of the present invention.
Figure 25:
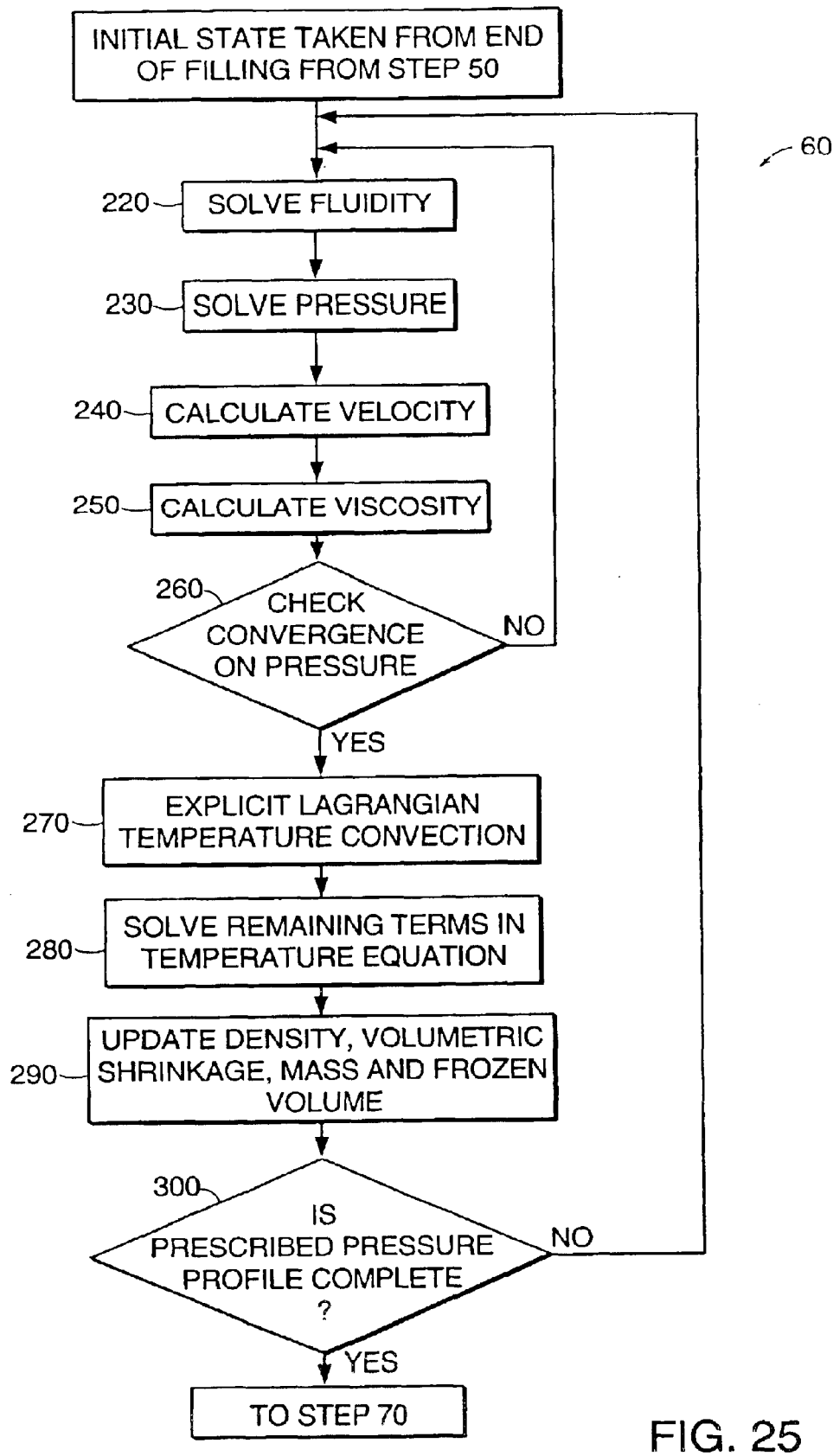
FIG. 25 is a schematic representation of a packing phase flowchart summarizing certain process steps in accordance with one embodiment of the present invention.

Before looking at the process steps of the filling phase and packing phase flowcharts of FIGS. 24 and 25, it may be advantageous to develop the underlying theory and basis for certain of the approaches taken therein.

As discussed hereinabove, certain limitations of conventional three dimensional injection molding modeling techniques relate to the large temperature gradients, movement of the solid/liquid interface boundary, large material property variations during solidification, and solidification of melt material during molding. Loosely grouped, about five innovative methodologies related to advantageous application of conservation of energy principles have been identified which offer substantial improvements in predictive accuracy and/or computation time. The first is the use of a one dimensional analytic function to describe the local temperature distribution at a node. The next is the definition of the variation of a one dimensional analytic function, with time, to account for heat convection. The third relates to the description of the variation of a one dimensional analytic function to account for viscous heat generation. The next entails the description of an explicit temperature convection scheme using the one dimensional analytic function. And the fifth addresses finite element mesh refinement, including a distance to the cavity wall computation algorithm. While recognition and application of the conservation of energy principles to the modeling of injection molding simulation are being categorized here in five general areas, these are not to be construed as limiting or otherwise, and are being presented in this manner solely for purposes of clarity.

Figure 3A:
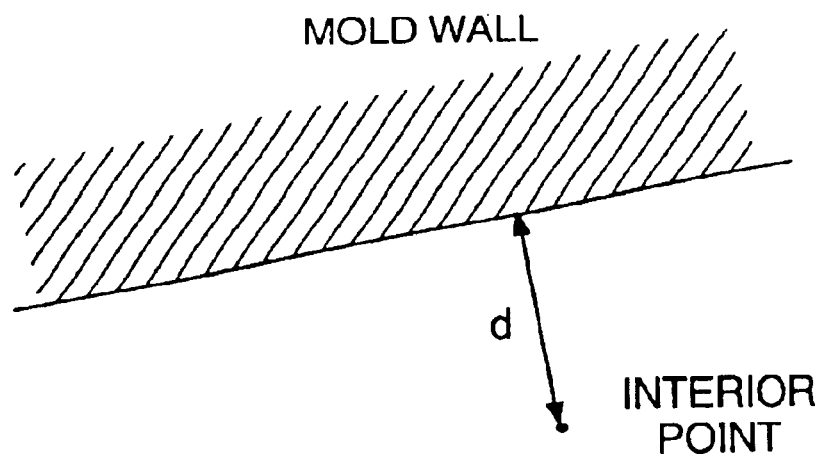
FIGS. 3A and 3B are schematic representations of an interior point in the mold cavity and the related temperature distribution along a line joining the interior point and the mold wall.
Figure 3B:
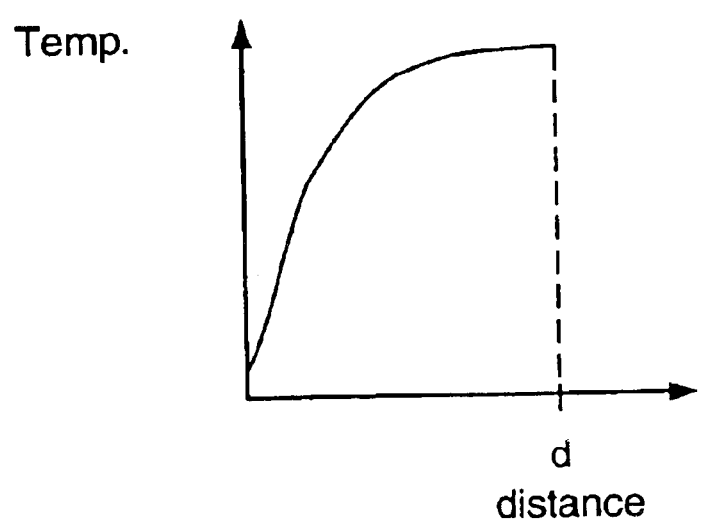

Looking first to use of a one dimensional analytic function to describe the local temperature distribution at a node, at any point in time during mold filling and packing, a temperature distribution exists between any given interior point within the material in the cavity and that part of the mold wall, in the immediate vicinity of the interior point. In general, the temperature distribution can be taken along a line that is the shortest distance, d, between the interior point and the mold wall. See, for example, FIG. 3A. FIG. 3B is a schematic representation of the temperature profile in the fluid along a line joining an interior point in the mold cavity and the mold wall, as a function of distance, d, from the mold wall.

A variety of analytic functions or discrete functions can be used to describe the temperature distribution. According to one embodiment, an error function formulation can be used, because of its physical significance in the solution of conduction heat transfer in a semi-infinite solid. According to the invention, any and every interior point is treated as if it were part of the domain of a semi-infinite solid. Each point is treated independently of every other point. The equation for heat conduction in a semi-infinite solid is used, with modification, to provide a better estimate of the local temperature distribution at a point in the cavity at all locations and times during the injection molding process, and respecting all significant heat transfer mechanisms.

The temperature distribution in a semi-infinite solid varies with time and distance from the finite boundary. In this application, the finite boundary may be defined as the mold cavity wall. When the temperature at the finite boundary of a semi-infinite solid, initially at a uniform temperature, $T_\infty$, is instantly changed to another temperature, $T_w$, the distribution of temperature in the solid varies with distance from the wall and time according to the following function:

$$T = T_w + (T_\infty - T_w)\text{erf}(d/2\sqrt{\alpha t}) \quad (7)$$

where:
- erf=error function;
- d=distance from wall;
- t=time;
- $T_\infty$=temperature at infinite distance from the wall;
- $T_w$=wall temperature; and
- $\alpha$=thermal diffusivity of solid.

See, for example, *Transport Phenomena*, by R. B. Bird, W. E. Stewart, and E. N. Lightfoot, published by John Wiley & Sons, 1960.

This function has been found to have several useful properties in the application to injection molding simulation. For example, it can capture spatial and temporal variation in temperature at both short and long distances and times. It is a simple form and easily computed. There are few adjustable parameters. It has physical significance, since heat conduction is a major heat transfer mechanism, and at short contact times, the equation is a close approximation to the solution for a finite slab, that is for a solid bounded by walls on both sides, similar to the situation in a mold cavity.

This function may be used advantageously to improve the local temperature accuracy, because over short time periods, the distribution of temperature is highly non-linear over a relatively large distance during injection molding. Since it is generally desirable to keep the number of nodes and elements relatively low in order to reduce the computational cost, the element dimensions are relatively large compared to the local cavity geometry being modeled. Also, the elements have linear shape functions. Consequently they cannot adequately describe the variation of temperature under circumstances where the temperature distribution is highly non-linear. This error function formulation can describe such a non-linear distribution of temperature.

Figure 4:
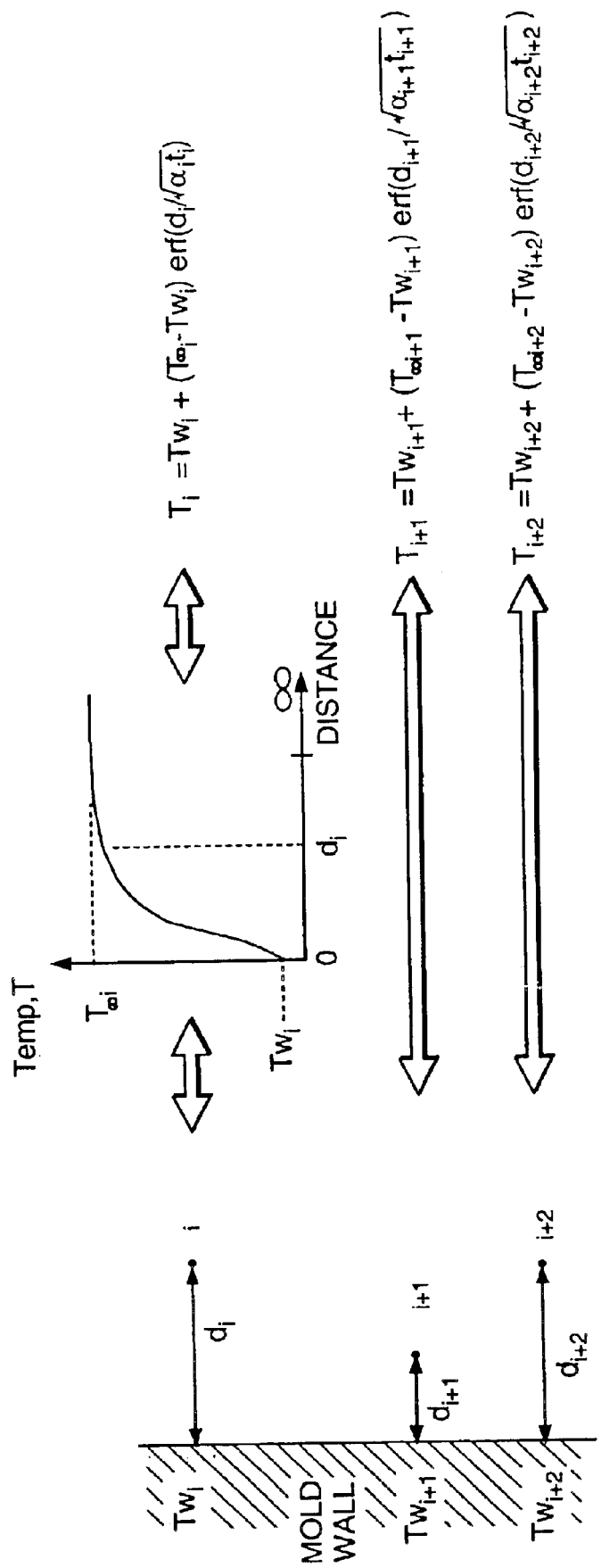
FIG. 4 is a schematic representation of the association of a one dimensional analytic function for temperature distribution at each point, i, within a mold cavity.

In its application, this function may be defined for each and every interior node in the three dimensional domain. The equation parameters for each node are defined separately for each node. See, for example, FIG. 4, which shows schematically the association of a one dimensional analytic function for temperature distribution at each point, i, within a mold cavity. Three points are shown.

The next innovative methodology relates to the definition of the variation of a one dimensional analytic function, with time, to account for heat convection. The use of the error function equation in the form presented hereinabove in certain circumstances may not be sufficient to model adequately the unique variation in temperature of a fluid during injection molding. In a strict sense, the error function equation is meant to be applied to a fluid that is semi-infinite in extent, and stationary. However, in a real injection molding application, the fluid is finite in extent, being bounded by the cavity walls, and the fluid is in motion for much of the process. The fluid motion, in particular, introduces another significant heat transfer mechanism, namely convection, the contribution of which should be included in the overall conservation of energy analysis to improve simulation predictive accuracy.

Consider the physical process of injection molding. Material contact enables heat conduction to proceed, which, in the absence of other heat transfer mechanisms, is adequately described by the error function equation at short times. However, convective heat transfer is superimposed on this mechanism. Convective heat transfer has the effect of retarding heat loss by conduction, because injection molding continuously brings hot material from upstream to any point under consideration during the filling phase.

Notice that the error function equation includes a term for time. Accordingly, it has been determined that one way to address the thermal input is to consider that the convective transfer of heat has the effect of retarding the passage of time for conduction at any point under consideration. So whilst real global clock time proceeds at a constant rate, describing the passage of injection time from filling through packing, each node may be considered to carry its own node thermal clock, which varies locally and typically may not proceed at the same rate as the global clock.

For example, if the fluid at an interior point in the cavity is stationary, then for as long as this is true, the node thermal clock marks out time at the same rate as the global clock. If, however, the fluid at an interior node is moving very quickly so that convection heat transfer dominates, then any local heat loss by conduction is wholly counteracted by heat input due to convection. In this case, the node thermal clock is stationary, not advancing at all, even while the global clock has moved on.

In the case where the flow is intermediate, so that neither conduction nor convection dominate, then the node thermal clock for an arbitrary node, i, may be incremented according the following equation:

$$t_i^k = t_i^{k-1} + \exp(-F_{pe} Pe_i) \Delta t \quad (8)$$

where:
- $t_i^k$=node thermal clock time used in the error function equation for node i at time step k;
- $t_i^{k-2}$=node thermal clock time used in the error function equation for node i at a previous time step k−1;
- $Pe_i$=Peclet number for node i;
- $F_{pe}$=tuning parameter; and
- $\Delta t$=global time clock increment.

and further where:

$$Pe_i = d_i v_i / \alpha_i \quad (9)$$

where:
- $d_i$=distance from wall of node i;
- $v_i$=local velocity of node i; and
- $\alpha_i$=thermal diffusivity of node i.

Whilst any of a number of equations could be used to describe the node thermal clock time advance, this empirical equation was selected because it has the desired properties. In particular:

As $v \to 0$, $\exp(-F_{pe}Pe)\Delta t \to \Delta t$;
As $v \to \infty$, $\exp(-F_{pe}Pe)\Delta t \to 0$;
As $\alpha \to 0$, $\exp(-F_{pe}Pe)\Delta t \to 0$; and
As $\alpha \to \infty$, $\exp(-F_{pe}Pe)\Delta t \to \Delta t$.

The tuning parameter constant $F_{pe}$ is found by tuning simulation results to experimental data. The data can be explicit temperature distribution data from injection molding experiments or indirect data, such as injection pressure measurements. It has been determined that the constant $F_{pe}$ may generally be set in the range of between about zero and one.

Yet another innovative methodology addresses the variation of a one dimensional analytic function to account for viscous heat generation. Since movement of the fluid requires mechanical work, thermodynamic principles require that heat is also added to the system through this work. In the case of fluid motion, this work takes the form of viscous dissipation or frictional heat. Frictional heat varies with time throughout the interior of the mold cavity during injection molding. In any time period, this thermal energy contribution is given by the product of the local shear stress and the local shear rate over that time period. It has been determined that this thermal contribution tends to be most significant in the vicinity of solid/fluid boundaries, where both viscosity is high, due to the relatively low temperature proximate the frozen material, and stress is high, due to motion of this viscous fluid.

Frictional heat can be considered as a local, time variant heat source at each point in the cavity. This local addition of heat cannot be accounted for by the above-referenced error function equation in its standard form. Up to this point, there is no mechanism to increase the fluid temperature in the functional description above the maximum value defined by the value of $T_\infty$; whereas, in injection trials, it has been determined that the temperature of the fluid proximate the liquid/solid boundary can exceed not only $T_{2S}$, but also the temperature of the fluid at the point of injection into the mold cavity.

Accordingly, to accurately model the temperature of the fluid in the cavity in a simulation, frictional heat should be considered in the analysis. When this is done, it may occur that the local temperature, even after convection and conduction, has increased above $T_\infty$. This shift in temperature can be accommodated by adjusting the far field temperature, $T_\infty$, at each time step. The adjustment is done by recalculating $T_\infty$ at the end of each time step in the simulation, for example, by substituting the computed nodal temperature after solution of the energy equation, into the error function equation and deriving a new value of $T_\infty$ at each node, i, in the cavity as follows:

$$T_{\infty_1} = T_{w_1} + \frac{(T_1 - T_{w_1})}{erf(d_i/2\sqrt{\alpha_i t_i})} \quad (10)$$

For any interior node, therefore, there is a mechanism to describe the local one dimensional temperature distribution and its variation in space and time. This permits the use of a better approximation than a simple linear interpolation, or even a higher order polynomial interpolation afforded by the element shape function. The new function can be used to dramatically improve the accuracy of convective heat transfer calculations and to compute the position of the solid/liquid interface at any time during the injection molding process.

Figure 5:
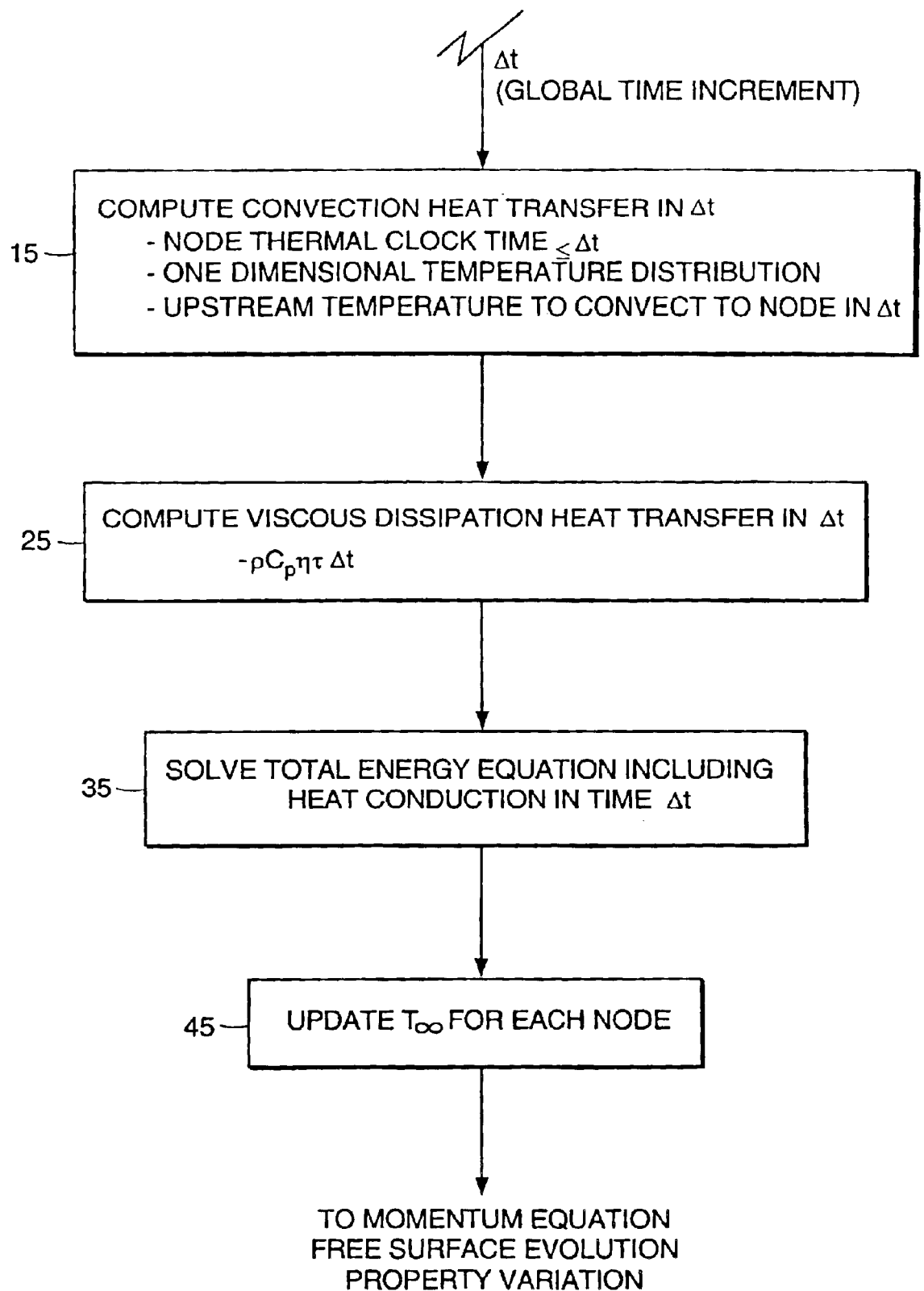
FIG. 5 is a schematic representation in flowchart form of the steps involved in an overall temperature solution over a global time increment in accordance with one embodiment of the present invention.

FIG. 5 is a schematic representation in flowchart form of the steps involved in the overall temperature solution over a global time increment, At, according to one embodiment of the invention, the details of which will be discussed more fully hereinbelow. In a first step 15, the contribution of convective heat transfer over the time increment is calculated. Then in step 25, the contribution of viscous dissipation heat transfer is calculated. Thereafter, in step 35, the total energy equation is solved, taking into account heat conduction over the time increment. The temperature $T_\infty$ is then updated, for each node, and the results are available for use in solving the momentum equation, determining evolution of the flow front during the filling phase, and quantifying material property variation, as will be discussed in greater detail hereinbelow.

A further area which has been addressed by the current invention concerns the description of an explicit temperature convection scheme using the one dimensional analytic function. Solution of the energy conservation equation for injection molding requires, in part, the computation of the contribution of convection to the overall heat transfer process. While a number of mechanisms have been contemplated to deal with convective heat transfer, according to one embodiment of the invention, an explicit scheme is used, in which the contribution to temperature change at each node is computed individually.

Since an explicit scheme entails finding the upstream point which will flow into a target node in a given time increment and interpolation of the temperature at that upstream point, the previously described one dimensional analytic function can be used to provide a far more accurate interpolation of temperature at the upstream point than otherwise. A Lagrangian interpolation is employed to determine the upstream terms, otherwise known as the advection terms. The same mechanism can be used to solve both the advection of temperature (convection), required for the energy equation solution, and the advection of matter (concentration) required for the solution of the free surface or flow front position within the mold cavity during the filling phase.

The Peclet numbers for the energy and concentration function equations are very large and infinity, respectively. Conventional finite element methods to simulate this feature are either unstable or tend to incorporate an unacceptable degree of diffusion that destroys accuracy. This is because conventional least-squares computational methods are unnatural ways to deal with the problem. It has been determined that the natural way to deal with hyperbolic differential equations is to follow the function along its characteristics. In the case of fluid flow in the injection molding context, this translates to tracking the path of an arbitrary "particle" in the continuum.

One object of the algorithm is, given any point in a three dimensional domain (in particular, a node), to use the velocity field to track the origin of the particle that now occupies the node, over the last time step. In other words, the concept is to look upstream to see where the particle, which now occupies the node, was at one time increment ago. Once the origin is determined, an interpolation can be performed to determine the value of the concentration function or temperature there, at the upstream point. Then, given this value, the value at the node under consideration can be updated accurately in the present time increment.

Figure 6:
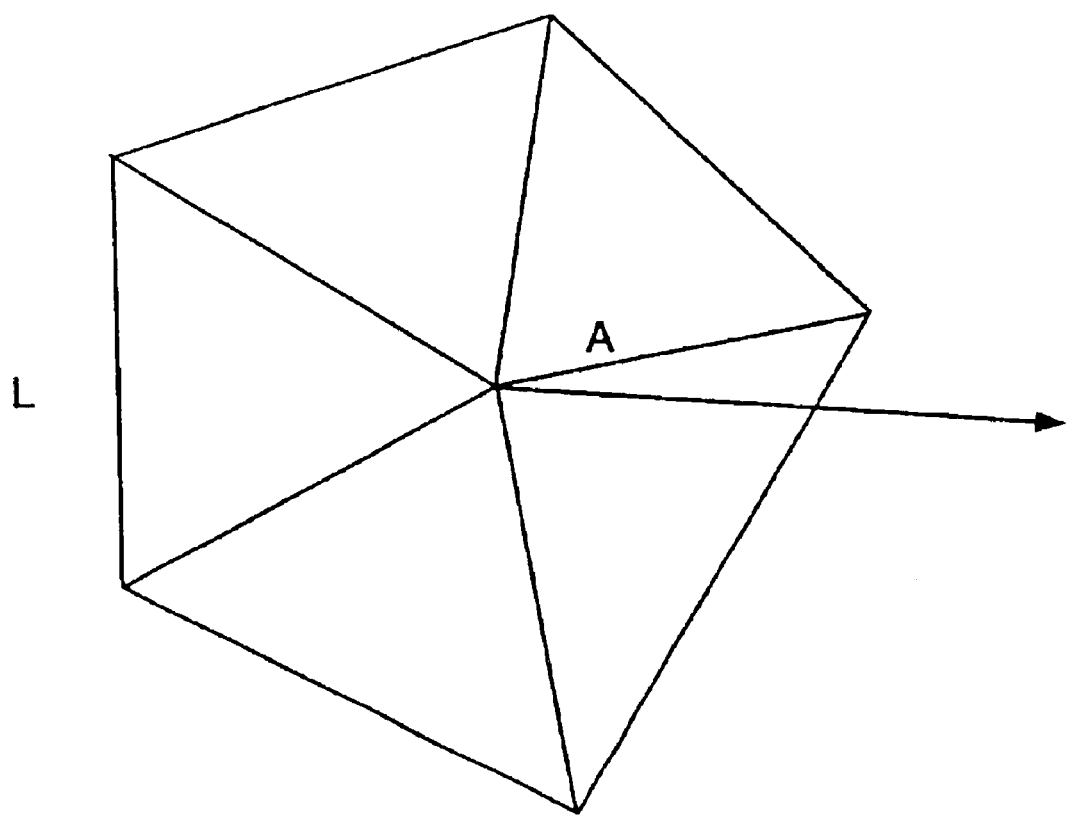
FIG. 6 is a schematic representation of velocity at a node and the relationship thereof with surrounding elements.

With reference now to FIG. 6, starting with a node, the velocity vector is as shown at node A. Without loss of generality, the elements in the figures are depicted as triangles, rather than tetrahedra, so as to facilitate depiction; however, as stated hereinabove, the elements may also comprise hexahedra, or other suitable elements shapes, depending on the mesh method utilized and the configuration of the model.

A cursory review of the figure suggests that the particle currently occupying node A comes from the triangle that has the opposite face L. However, an algorithm recognizes this by testing to see which triangle/tetrahedron satisfies all required criteria. The test should be computationally fast. This part of the calculations, of determining which of the surrounding triangles/tetrahedra is the correct one, is performed in subroutine upwelm1.F, discussed hereinbelow.

Once the correct triangle/tetrahedron is recorded, it may be that the particle comes from beyond the face L. This may be confirmed by comparing the current time step size with the time required for a particle to traverse the triangle/tetrahedron starting from face L. If the search is required to extend beyond L into a contiguous triangle/tetrahedron, subroutine contig.F, also discussed hereinbelow, determines the correct neighboring triangle/tetrahedron and rearranges the local shape function values accordingly. In a triangle example, suppose the shape function array at L is [0.2,0.8, 0.0]. Then if the order of the node numbers on L are reversed in the contiguous element, the shape function array becomes [0.8,0.2,0.0], it being assumed that the third node and A both are the last nodes in the elements, ergo the value of 0.0 at face L.

Figure 7:
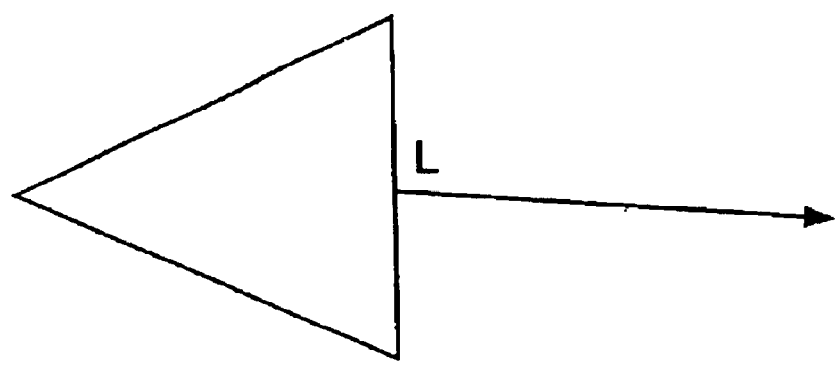
FIG. 7 is a schematic representation of velocity on a face of an element.

The next issue is represented schematically in FIG. 7. The velocity is computed at the relevant position on L, and is used to determine from which face a particle with that velocity could originate. This is computed in subroutine upwelm2.F, discussed below. One will note that the main difference between upwelm1.F and upwelm2.F is that in the former the search is from a node for the upstream element of the connected elements; whereas, in the latter, the search is from a face for the upstream face within the same element. Also note, that if the particle comes from beyond the opposite face, then after rearranging the numbering in contig.F, all further searches can be accomplished in upwelm2.F.

Both upwelm1.F and upwelm2.F subroutines start from the fundamental relation between the global and local coordinates:

$$x - x_4 = J \cdot L \qquad (11)$$

The letters are displayed in bold to denote a vector (x, L) or a matrix (J), where: x is any global position vector (coordinates); L is the local coordinate vector; J is the Jacobian of transformation between the two coordinate systems; and $x_4$ is the location of the fourth node of the element in the global coordinate system.

Figure 8:
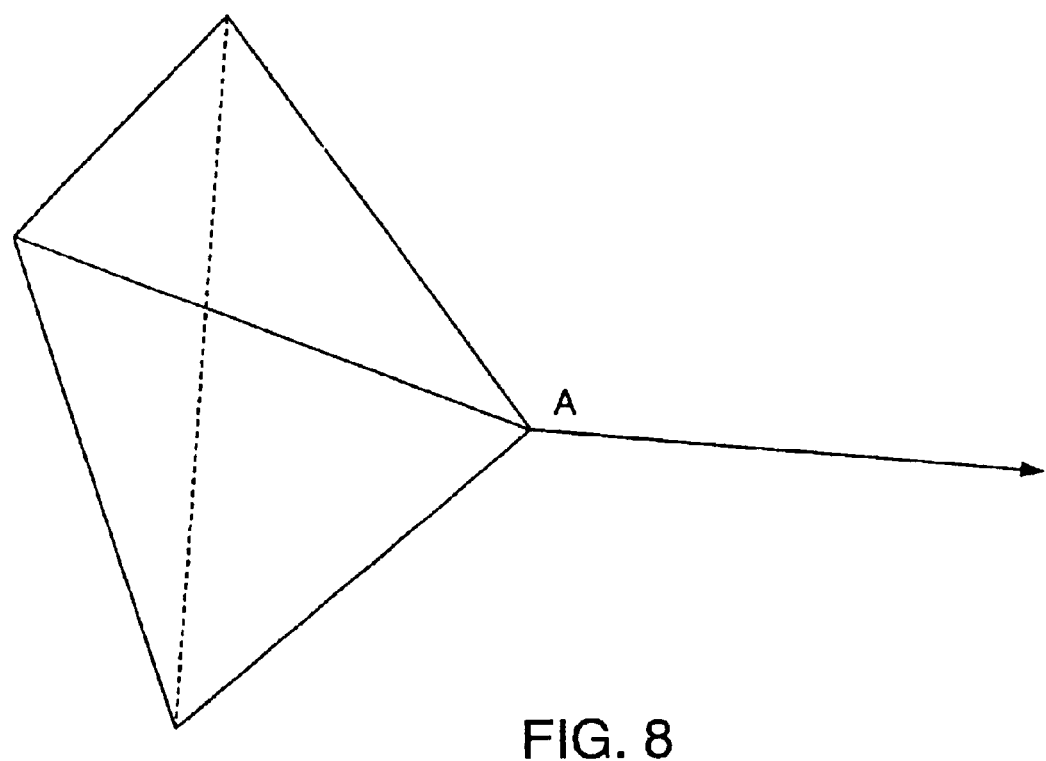
FIG. 8 is a schematic representation of velocity at a node and the relationship thereof with a connected, upstream tetrahedral element.

The upwelm1.F subroutine may be described as follows, with reference to FIG. 8. Starting at a node A, it is desirable to find the first upwind intercept with an element facet, or the upwind location within the element if the time-step is not sufficient to reach the facet. The velocity at A is known, as depicted in FIG. 8.

In a first case, suppose node A is the fourth node in the element node order of the tetrahedron shown in the figure. This yields:

$$L = J^{-1}(x - x_4) \qquad (12)$$

The next step is to find where the particle trajectory intercepts the (infinite) plane defined by the facet opposite the node A. Note that there must be an intercept somewhere, unless the velocity is parallel to the plane. A position x is on the trajectory of the particle if $$x = x_4 - kv \qquad (13)$$

Here, k is the time upstream from $x_4$. Substituting equation (13) in equation (12)12), the local coordinates of this position x are:

$$L = J^{-1} \cdot (-kv) \qquad (14)$$

The trajectory intercepts the plane where $L_4 = 0$, therefore:

$$\sum_{i=1}^{3} L_i = 1 \qquad (15)$$

Expanding this yields:

$$-k \sum_{i=1}^{3} \sum_{j=1}^{3} J_{ij}^{-1} v_j = 1 \qquad (16)$$

Making k the subject of the formula:

$$k = \frac{-1}{\sum_{i=1}^{3} \sum_{j=1}^{3} J_{ij}^{-1} v_j} \qquad (17)$$

For this facet to be a candidate, k must be both positive (i.e. a facet upstream of node A) and finite. An infinite value implies that the velocity is parallel to the opposite face L. If k is both positive and finite, the next step is to check if the intercept with the facet plane is within the boundaries of the facet. This is true if and only if all three components of L associated with the facet nodes are non-negative. The components can then be computed by substituting k from equation (17) into equation (14).

In a second case, suppose A is not the fourth node, but some node m, where m is any of 1, 2, or 3. Then the intercept of the trajectory with the plane of the facet opposite A occurs where $L_m = 0$. Suppose this is at some position x so that:

$$x = x_m - kv \qquad (18)$$

Inserting equation (18) in equation (12), and considering the mth node (the notation uses m to describe both local and global node number), yields:

$$L_m = \sum_{j=1}^{3} J_{mj}^{-1}(x_m^j - kv_j - x_4^j) = 0 \qquad (19)$$

The superscript on x indicates the coordinate component (for example, $x^2 \equiv y$, and $x^3 \equiv z$). Making k the subject of the formula yields:

$$k = \frac{\sum_{j=1}^{3} J_{mj}^{-1}(x_m^j - x_4^j)}{\sum_{j=1}^{3} J_{mj}^{-1} v_j} \qquad (20)$$

For this facet to be a candidate, k must be both positive (i.e. a facet upstream of node A) and finite. An infinite value implies that the velocity is parallel to the opposite face L. If k is both positive and finite, the next step is to check if the intercept with the facet plane is within the boundaries of the facet. This is true if and only if all three components of L associated with the facet nodes are non-negative. The components can then be computed by substituting kfrom equation (20) into equation (14).

Upon finding the correct facet, the next step is to determine whether the upwind point is still further upstream, by comparing k at the intercept with the time-step Δt. If further upwinding is required, subroutine contig.f is called to find the element neighboring the new intercept facet and the logical opface is set to true, ready to call subroutine upwelm2.F. If, however, the upwind point is within the current element, the local coordinates can be determined by using Δt rather than k in equation (4), in which case opface is left false.

Figure 9:
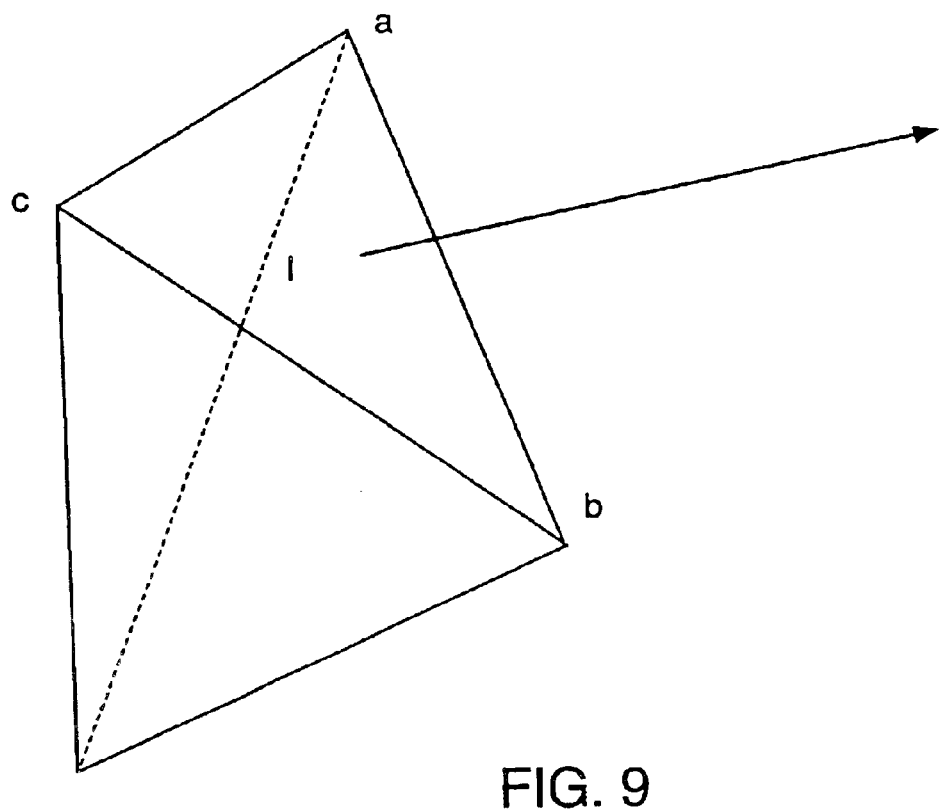
FIG. 9 is a schematic representation of velocity at a face of an element and the relationship thereof with a connected, upstream tetrahedral element.

The upwelm2.F subroutine may be described as follows, with reference to FIG. 9. First, the local velocity, v, is computed at the current intercept $x_1$, by interpolation on the facet L. Because some time has already been used in reaching L from the original node A, there is only some time $\Delta t_{rem}$ remaining of the original time-step $\Delta t$. There are three candidate facets which are checked by testing the intercept of the trajectory with each of their planes. This can be done by setting $L_i$,32 0 for each node of the current facet, nodes a, b, and c in FIG. 9.

A position x is on the trajectory if:

$$x = x_i - kv \tag{21}$$

The local coordinates of points on the trajectory are therefore:

$$L = J^{-1} \cdot (x_i - kv - x_4) \tag{22}$$

The equations below are used for each node a, b, c in turn. For simplicity, assume the following cases are for testing the facet solely opposite node a. In a first case, suppose node a is the fourth node in the element node order of the tetrahedron shown in FIG. F. Set $L_4 = 0$ to find the facet plane intercept. This implies equation (15), which is expanded using equation (22) to give:

$$\sum_{i=1}^{3} \sum_{j=1}^{3} J_{ij}^{-1}(x_i^j - kv_j - x_4^j) = 1 \tag{23}$$

Solving this for k yields:

$$k = \frac{\sum_{i=1}^{3} \sum_{j=1}^{3} J_{ij}^{-1}(x_i^j - x_4^j) - 1}{\sum_{i=1}^{3} \sum_{j=1}^{3} J_{ij}^{-1} v_j} \tag{24}$$

In a second case, suppose a is not the fourth node, but some node m, where m is any of 1, 2, or 3. Then the intercept of the trajectory with the plane of the facet opposite node a occurs where $L_m = 0$. Substituting this in equation (22), yields:

$$\sum_{j=1}^{3} J_{mj}^{-1}(x_i^j - kv_j - x_4^j) = 0 \tag{25}$$

Solving this for k yields:

$$k = \frac{\sum_{j=1}^{3} J_{mj}^{-1}(x_i^j - x_4^j)}{\sum_{j=1}^{3} J_{mj}^{-1} v_j} \tag{26}$$

To determine if this facet is valid, the same checks as described for upwelm1.F above can be performed. Upon finding the correct facet, the next step is to determine whether the upwind point is still further upstream by comparing k at the intercept with $\Delta t_{rem}$. If further upwinding is required, subroutine contig.f can be called to find the element neighboring the new intercept facet and the above procedure can be repeated. In this case $\Delta t_{rem}$ is decremented appropriately. If, however, the upwind point is within the current element, the local coordinates can be determined by using $\Delta t_{rem}$, rather than k in equation (12), and upwelm2.F can then be exited.

Figure 10A:
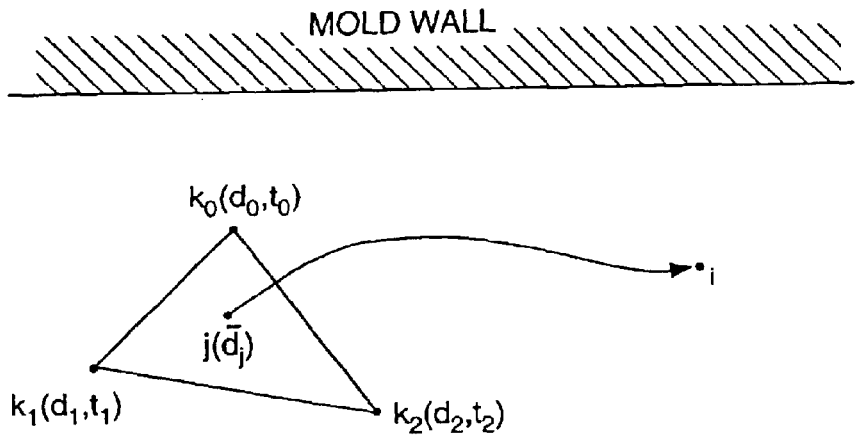
FIGS. 10A, 10B are schematic representations of an interior point in the mold cavity and interpolation of upstream temperature using a one dimensional analytic function at upstream element nodes.
Figure 10B:
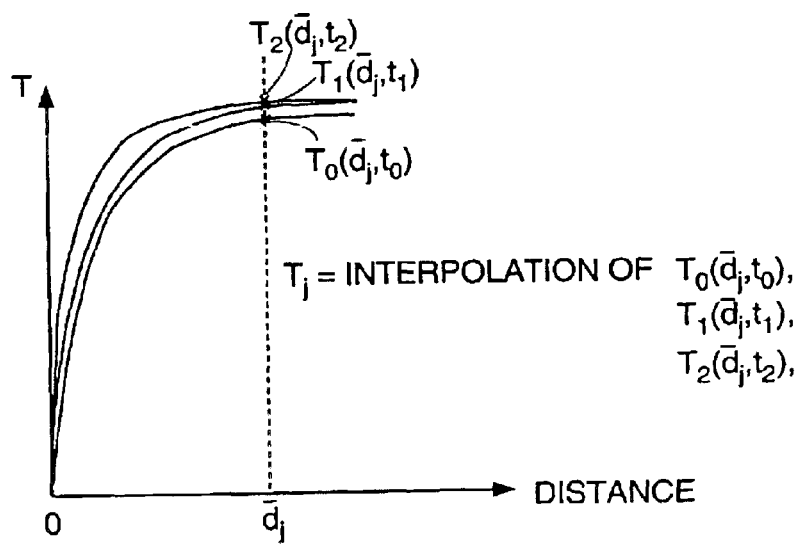

Once the upstream point which will flow into a target node in a given time increment has been identified in accordance with the methods described above, the temperature at that upstream point needs to be determined. One accurate method of determining the temperature of the upstream point employs a one dimensional analytic temperature function, as depicted in FIGS. 10A and 10B. As before, triangular elements are shown for ease of visualization, but the concept applies to three dimensional elements, without loss of generality.

In general, for each node, the respective upstream point that will "flow" or be convected to that node in the required time increment is determined. This may be a point in the element of which the node forms a part, or it may be a point within another element some distance away. The upstream point may or may not coincide with an upstream node. If not, interpolation is required to estimate the temperature at the upstream point. According to one method, two steps may be used.

In the first step, the distance to the cavity wall of the upstream point is estimated. While in this embodiment the wall is used as the reference surface, in other embodiments other datums could be used, such as the surface of the frozen layer. In determining the distance to the wall, a variety of methods could be used. Since, in general, the upstream point will not be coincident with a node, its distance to the wall can be determined by linear interpolation of the distances to the wall of all the nodes in the element that enclose the upstream point. This interpolation makes use of the element shape function.

In the second step, the one dimensional analytic function at each of the nodes in the element is used to provide estimates of the temperature at the upstream point by substituting the distance to the wall of the upstream point. The final temperature at the upstream point is obtained by interpolation of the four node estimates according to the element shape function. This then, is the value of temperature which, in a given time increment, is convected to the node under consideration.

In another embodiment, the distance to the wall and the one dimensional analytic function describing the temperature distribution of the upstream point is taken as the nearest node in the upstream element.

While there are specific cases to be dealt with, for example, if the upstream point is the injection location, these cases do not detract from the fundamental idea or use of the one dimensional analytic function to estimate temperature.

Still another innovative methodology is related to anisotropic mesh refinement, including a distance to the mold cavity wall computation algorithmn. Anisotropic mesh refinement is a powerful means of increasing resolution in a mold cavity withoutan unnecessary increase in computational burden through over refinement. The embodied refinement process breaks down existing tetrahedral elements into smaller tetrahedra. However, the process is only applied where an insufficient number of layers is present. If sufficient layers are present to capture with accuracy the solution of variables, then no refinement takes place. The algorithm runs as follows, according to one embodiment of the invention.

An existing tetrahedral mesh is labeled with layer numbers. First, label all nodes on the cavity wall as layer zero. Then, label all nodes adjacent to layer zero as layer one. Next, label all nodes adjacent to layer one as layer two, and repeat with successively increasing layer numbers until all nodes are assigned a layer number. The purpose is to establish how many layers exist in each region of the mold cavity and to refine to a required number of layers in only those regions that require it.

In each region for which the number of layers is insufficient, the tetrahedral elements are split. The splitting process results in elements of greater aspect ratio than the original tetrahedron. Consequently, the refined mesh becomes anisotropic in that the aspect ratio departs significantly from unity. Since the splitting process occurs between successive layers, the refinement is biased towards increasing the density of elements and nodes in the thickness direction. This is precisely what is required for increasing accuracy in simulations since, as described earlier, the field variables vary most significantly through the part thickness. FIGS. 11 through 17 show possible ways in which a tetrahedron can be split.

Figure 11:
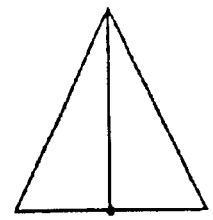
FIG. 11 is a schematic representation of tetrahedral element face splitting combinations.
Figure 11:
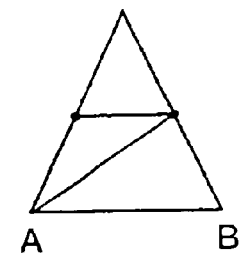
Figure 11:
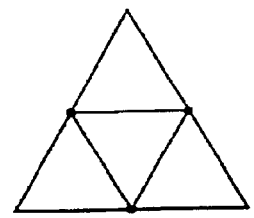
Figure 12:
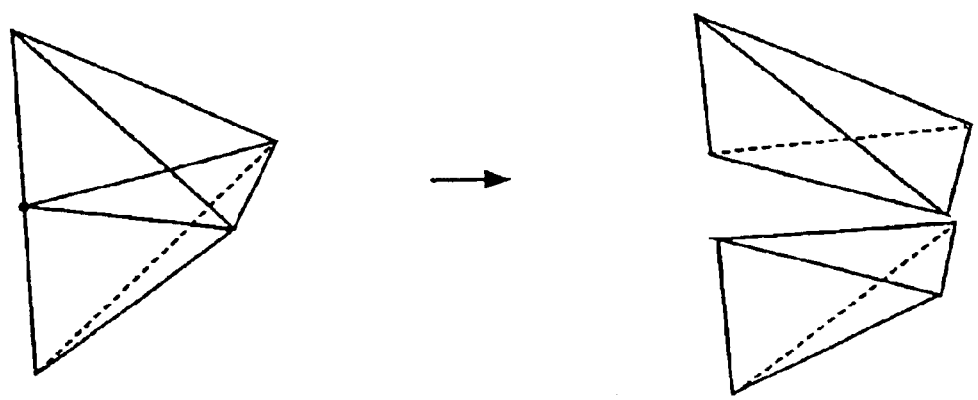
FIG. 12 is a schematic representation of a template for splitting a tetrahedral element on one edge.
Figure 13A:
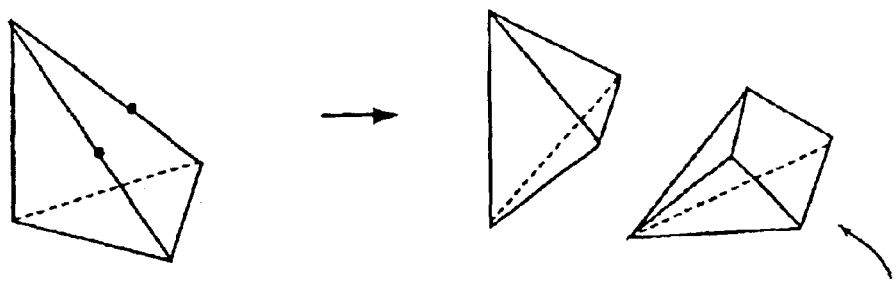
FIG. 13A is a schematic representation of a template for splitting a tetrahedral element on two adjacent edges.
Figure 13A:
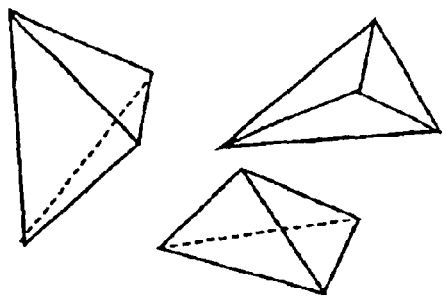
Figure 13A:
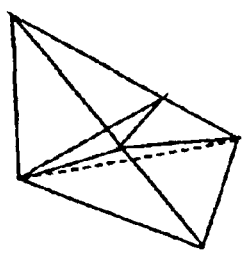
Figure 13B:
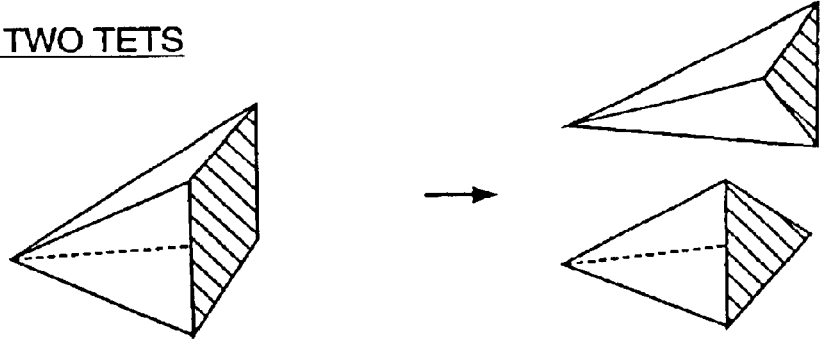
FIG. 13B is a schematic representation of a template for splitting a four-sided base pyramid.
Figure 13C:
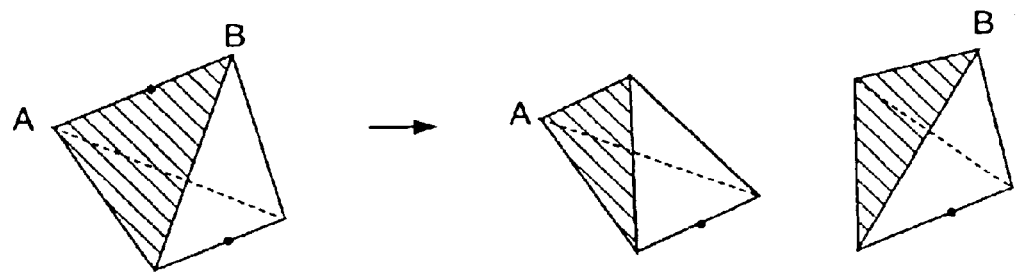
FIG. 13C is a schematic representation of a template for splitting a tetrahedral element on two opposite edges.
Figure 13C:
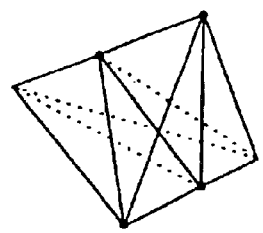

More specifically, FIG. 11 is a schematic representation of tetrahedral element face splitting combinations. All of the element splitting templates in the following drawings produce one of the three patterns on the element faces depicted in FIG. 11. Either one, two, or three edges can be refined. If this were not true, then mesh face continuity during refinement would not be possible. FIG. 12 is a schematic representation of a template for splitting a tetrahedral element on one edge. FIG. 13A is a schematic representation of a template for splitting a tetrahedral element on two adjacent edges, which entails a first split into two elements, one of which is a four-sided base pyramid, then a subsequent split of the pyramid into to tetrahedral elements in accordance with the template depicted in FIG. 13B. As a general rule when splitting a four-sided base pyramid, choose the diagonal of the base to split on which contains the node with the lowest number of the four base nodes. FIG. 13C is a template for splitting a tetrahedral element on two opposite edges. The first split yields two tetrahedral elements which each require a split on one edge, using the appropriate template.

Figure 14A:
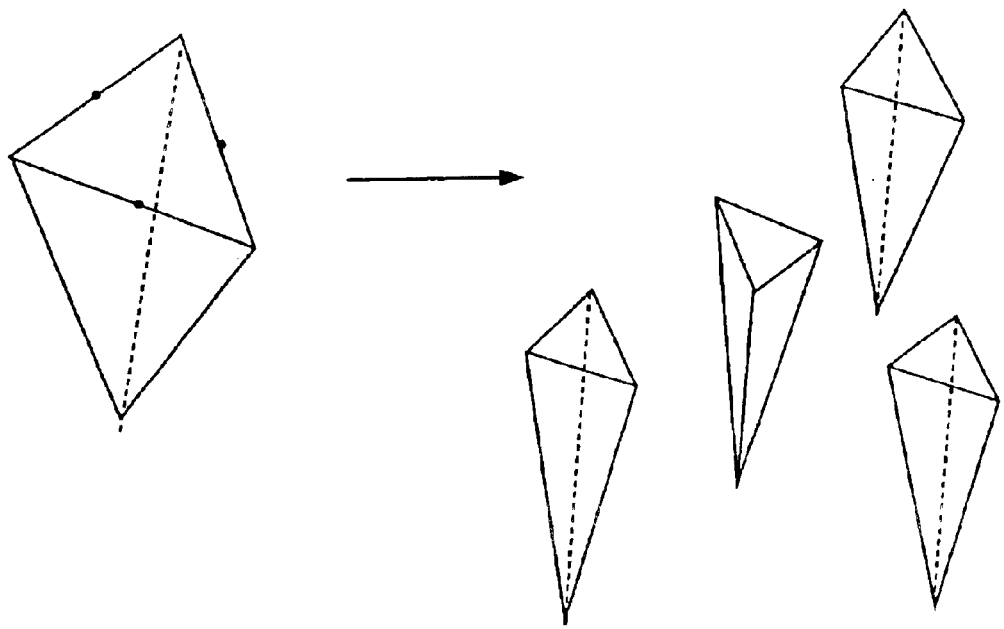
FIG. 14A is a schematic representation of a template for splitting a tetrahedral element on three edges with a common shared face.
Figure 14A:
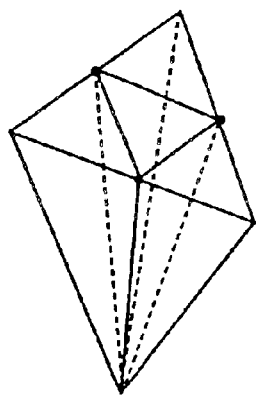
Figure 14B:
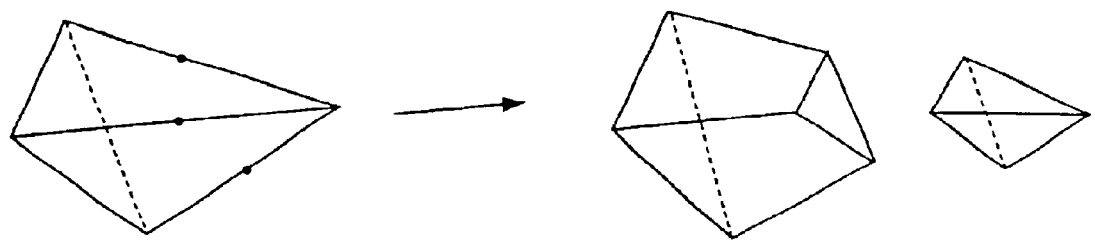
FIG. 14B is a schematic representation for splitting a tetrahedral element on three edges with a common node.
Figure 14B:
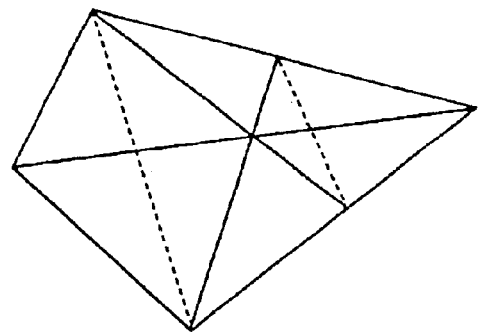
Figure 14C:
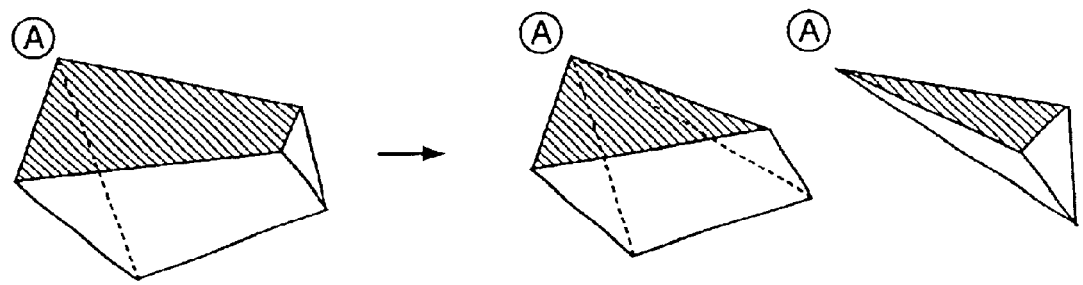
FIG. 14C is a schematic representation of a template for splitting a triangular prism.
Figure 14C:
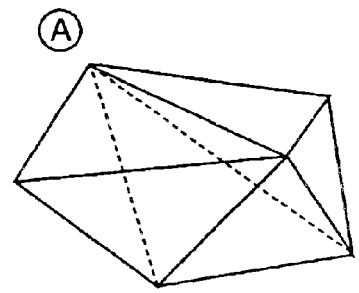
Figure 14D:
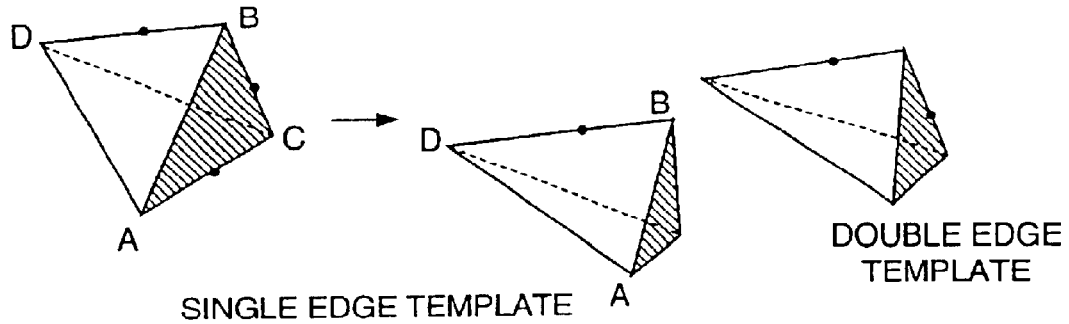
FIG. 14D is a schematic representation of a template for splitting a tetrahedral element on three edges in series.
Figure 14D:
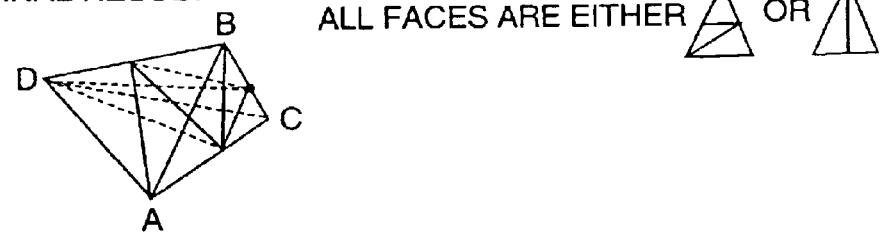
Figure 14D:
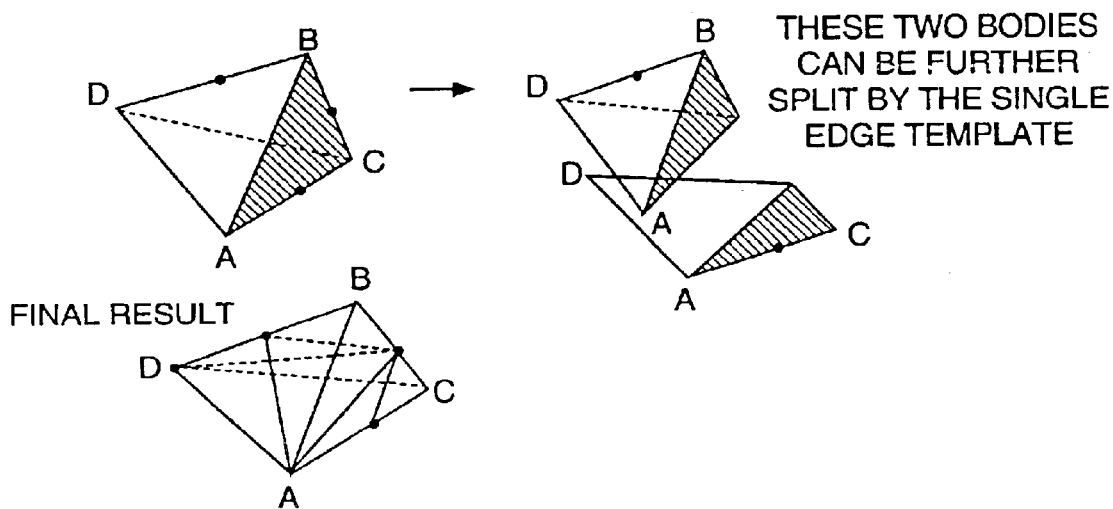

FIG. 14A is a schematic representation of a template for splitting a tetrahedral element on three edges with a common shared face and FIG. 14B is a schematic representation for splitting a tetrahedral element on three edges with a common node. The latter results in a tetrahedral element and a triangular prism element, which can be split in accordance with the template depicted in FIG. 14C. Note that node A will be the node with the lowest node number of the six nodes present. This ensures that the two quadrilaterals split by the first step are split with the diagonal including the lowest node. Also, the first step creates a tetrahedral element and a quadrilateral-based pyramid, which can be subsequently split. FIG. 14D is a template for splitting a tetrahedral element on three edges in series, of which two possible combinations result, depending on which nodes have the lowest node number.

Figure 15A:
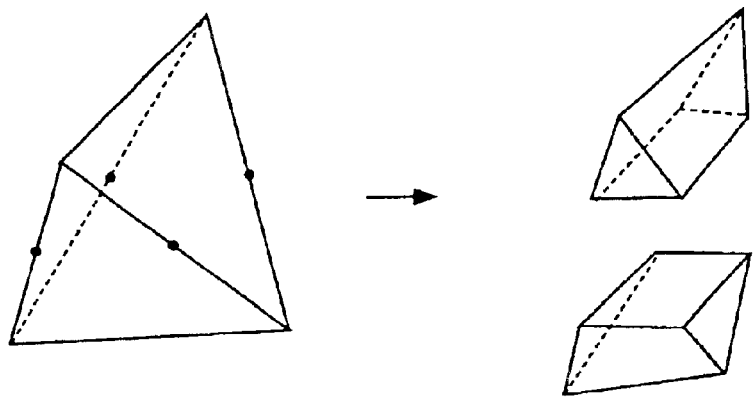
FIG. 15A is a schematic representation of a template for splitting a tetrahedral element on four opposite edges.
Figure 15A:
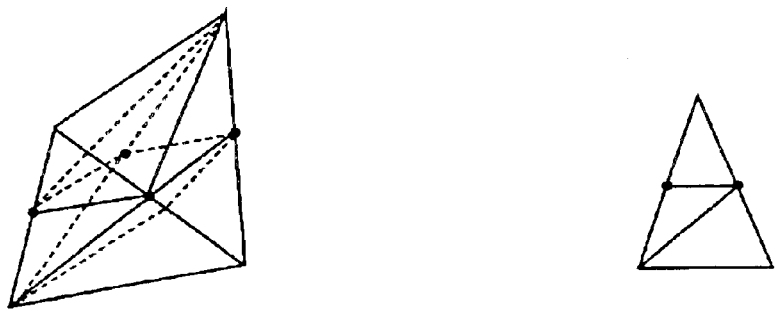
Figure 15B:
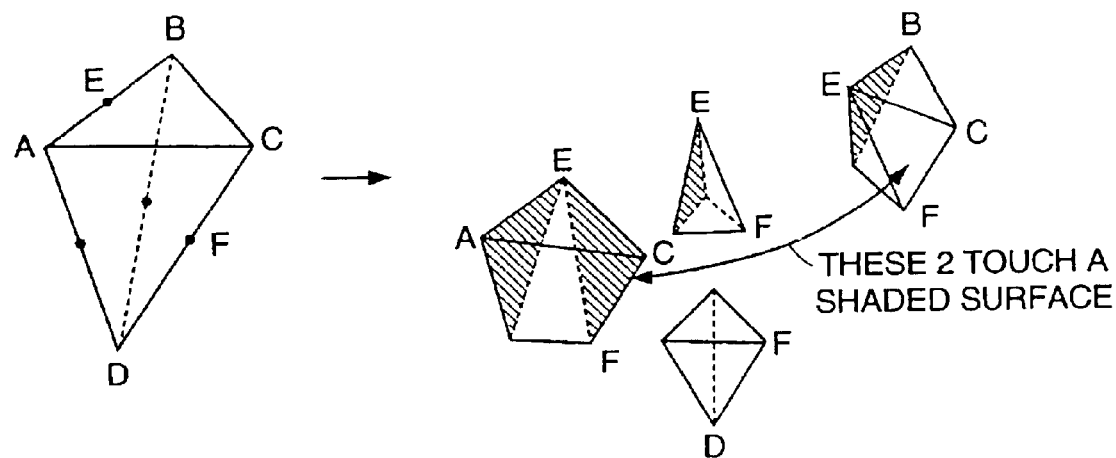
FIG. 15B is a schematic representation of a template for splitting a tetrahedral element on four adjacent edges.
Figure 15B:
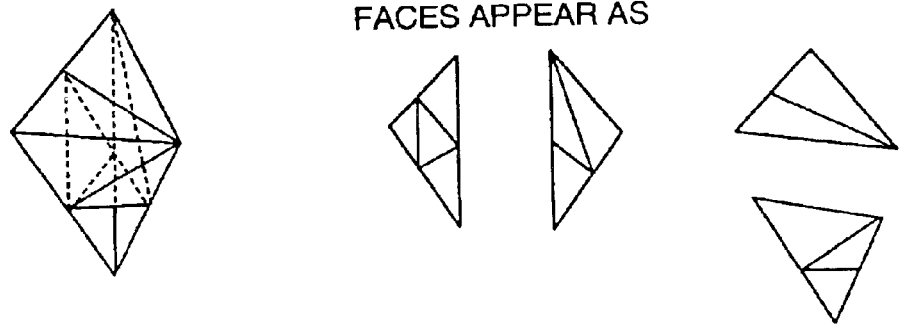

FIG. 15A is a template for splitting a tetrahedral element on four opposite edges. A first symmetrical split results in two triangular prisms, which in turn are split as depicted in FIG. 14C. FIG. 15B is a template for splitting a tetrahedral element on four adjacent edges. The division produces two tetrahedral elements and two quadrilateral-base pyramids, which can be split using the appropriate template and rules discussed hereinabove.

Figure 16:
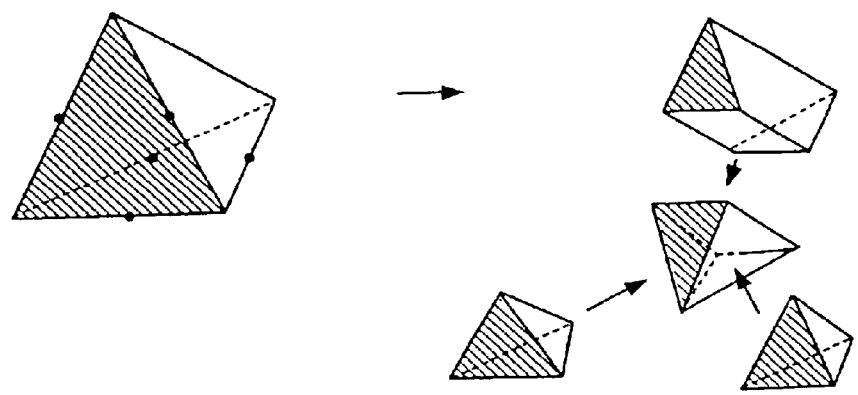
FIG. 16 is a schematic representation of a template for splitting a tetrahedral element on five edges.
Figure 16:
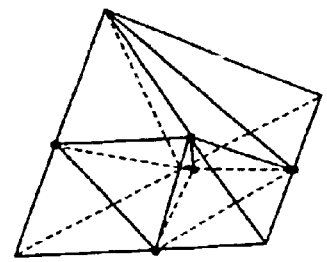
Figure 17:
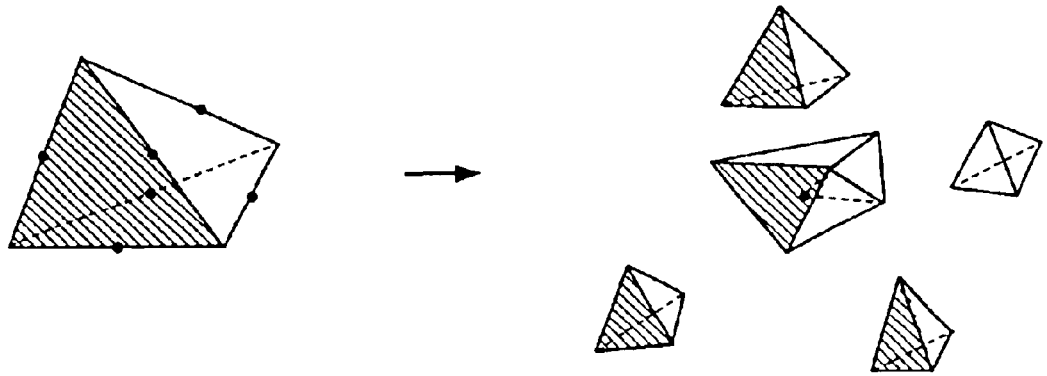
FIG. 17 is a schematic representation of a template for splitting a tetrahedral element on six edges.
Figure 17:
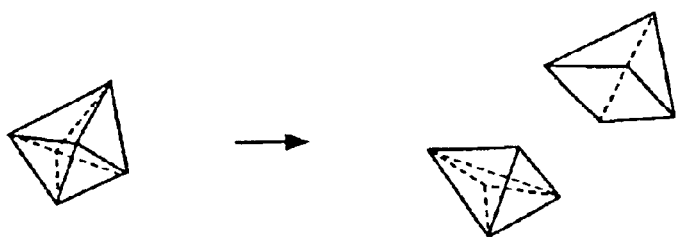
Figure 17:
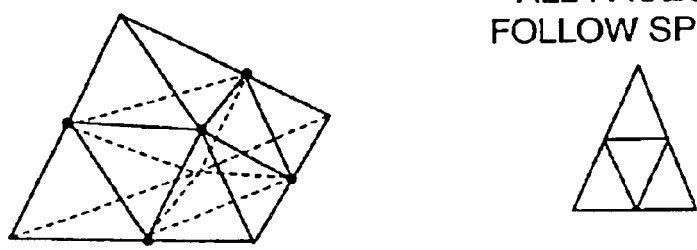

FIG. 16 is a template for splitting a tetrahedral element on five edges, which yields two tetrahedral elements, and a triangular prism and a quadrilateral-base pyramid, both of which can be split using the appropriate templates discussed hereinabove. Lastly, FIG. 17 is a template for splitting a tetrahedral element on six edges. Cutting a tetrahedral element off of each corner yields a central body with eight triangular faces. Splitting the central body in half on a quadrilateral plane yields two quadrilateral pyramids, which can be further split according to the template discussed hereinabove.

Referring once again to the layering, it has been determined that an optimal number of layers is six, and an optimal aspect ratio is fifteen. Values outside this range can be used, but when the number of layers decreases, and the maximum aspect ratio increases, accuracy is generally reduced. Conversely, when the number of layers increases and the aspect ratio decreases, the number of elements grows quickly, and the computational cost becomes tends to become prohibitive.

In order to compute the distance to the wall for each internal node, nodes are numbered according to their layer and a tree constructed as an aid to finding the nearest wall location. The algorithm proceeds as follows in accordance with one embodiment of the invention.

First, label all nodes on the cavity wall as layer zero. Then label all nodes adjacent to layer zero as layer one. Next, label all nodes adjacent to layer one as layer two, and repeat with successively increasing layer numbers until all nodes are assigned a layer number. Thereafter, for each node, construct a tree of node associations for all connected nodes that have a lower layer number down to layer number zero, that is wall nodes. Then, project the target node on all faces formed by the layer zero nodes in the tree. The distance to the wall is recorded as the shortest distance in the set of possible distances. This method has the advantage of narrowing the possible search space for shortest distance. In the event that the node cannot be projected onto a face formed by nodes with layer number zero in its tree, then the distance is taken as the distance to the nearest layer zero node.

Figure 18A:
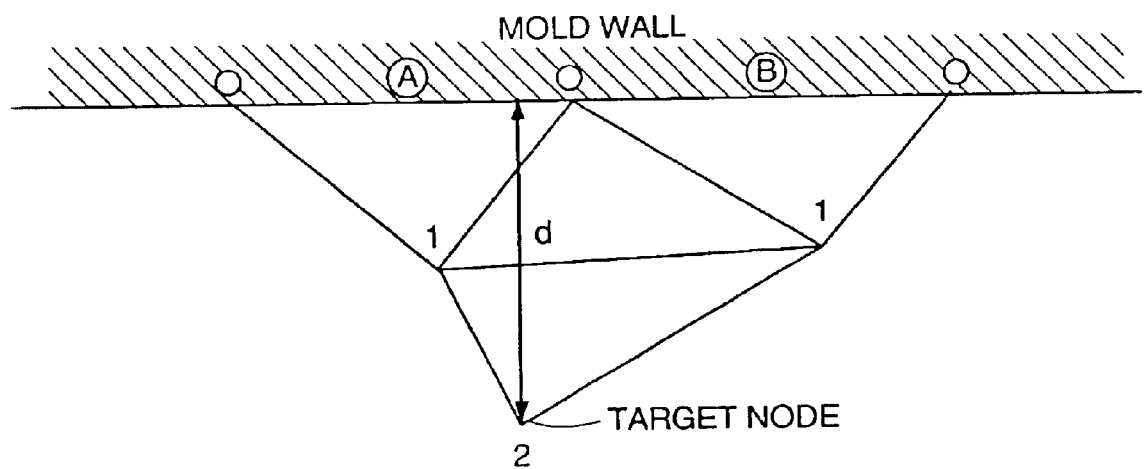
FIGS. 18A and 18B are schematic representations of node layer numbering and connectivity trees used in determination of distance to the cavity wall to limit the possible search space.
Figure 18B:
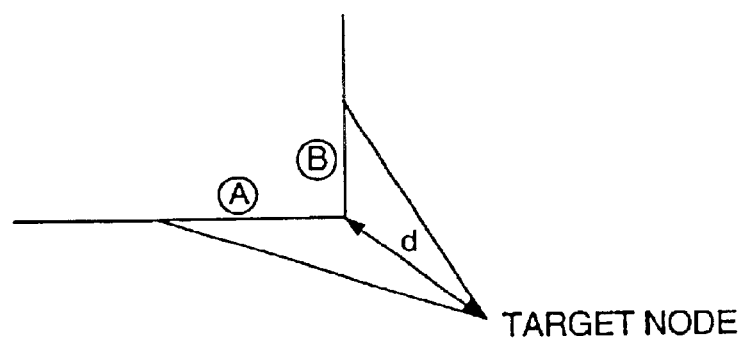

This algorithm is presented diagramatically in FIGS. 18A and 18B. In FIG. 18A, the node layer numbering and the connectivity tree limits the search space for projection of the target node to faces "A" and "B," which is a much smaller set than all possible faces in a cavity and is therefore highly efficient. In the case depicted in FIG. 18B, where the target node cannot be projected onto either face "A" or "B" in its connectivity tree, the distance, d, is taken to the nearest wall node. As discussed hereinabove, significant improvements in simulation predictive accuracy have been achieved not only by consideration and application of conservation of energy principles, but also by addressing the forming frozen or solidifying layer proximate the mold cavity wall. Limitations of conventional three dimensional injection molding modeling techniques often relate to the large temperature gradients, movement of the solid/liquid interface boundary, large material property variations during solidification, and solidification of melt material during molding.

Loosely grouped, about five innovative methodologies related to advantageous treatment of the solidified material have been identified which offer substantial improvements in predictive accuracy and/or computation time over conventional simulation methods. The first relates to the determination of the position of the solid/liquid interface. The next is the formulation of elements with a linear variation of material properties throughout. The third relates to determination of an effective viscosity function in elements containing the solid/liquid interface. The next entails elimination of frozen nodes and elements from the solution domain. And the fifth addresses computation of the effective pressure in regions that have solidified.

Looking first to the determination of the position of the solid/liquid interface, in an element through which a solid/liquid interface exists, that is to say in an element which contains both a solid region and a liquid region, material properties typically vary by several orders of magnitude across the interface boundary. In particular, the viscosity in the solid region (if it is appropriate to use the term viscosity at all) is practically infinite, whilst in the liquid region, viscosity is finite and relatively small. Accordingly, simple conventional element assembly procedures used in the finite element method will result in an effective overestimate of the elemental resistance to flow, because the element stiffness will be biased heavily towards the high viscosity value. This is true regardless of how much of the element is actually frozen. The net result is overprediction of pressure drop during flow.

In accordance with one embodiment of the invention, this problem can be resolved by making use of the one dimensional analytic function for temperature to more accurately estimate the position of the solid/liquid interface, and then defining an effective nodal viscosity related to the quantity of frozen material in an element. The position of the interface is chosen by examining the intersection of the temperature profile and the solidification temperature of the polymer material. The solidification temperature, $T_s$, defines the transition between solid and liquid states.

Figure 19:
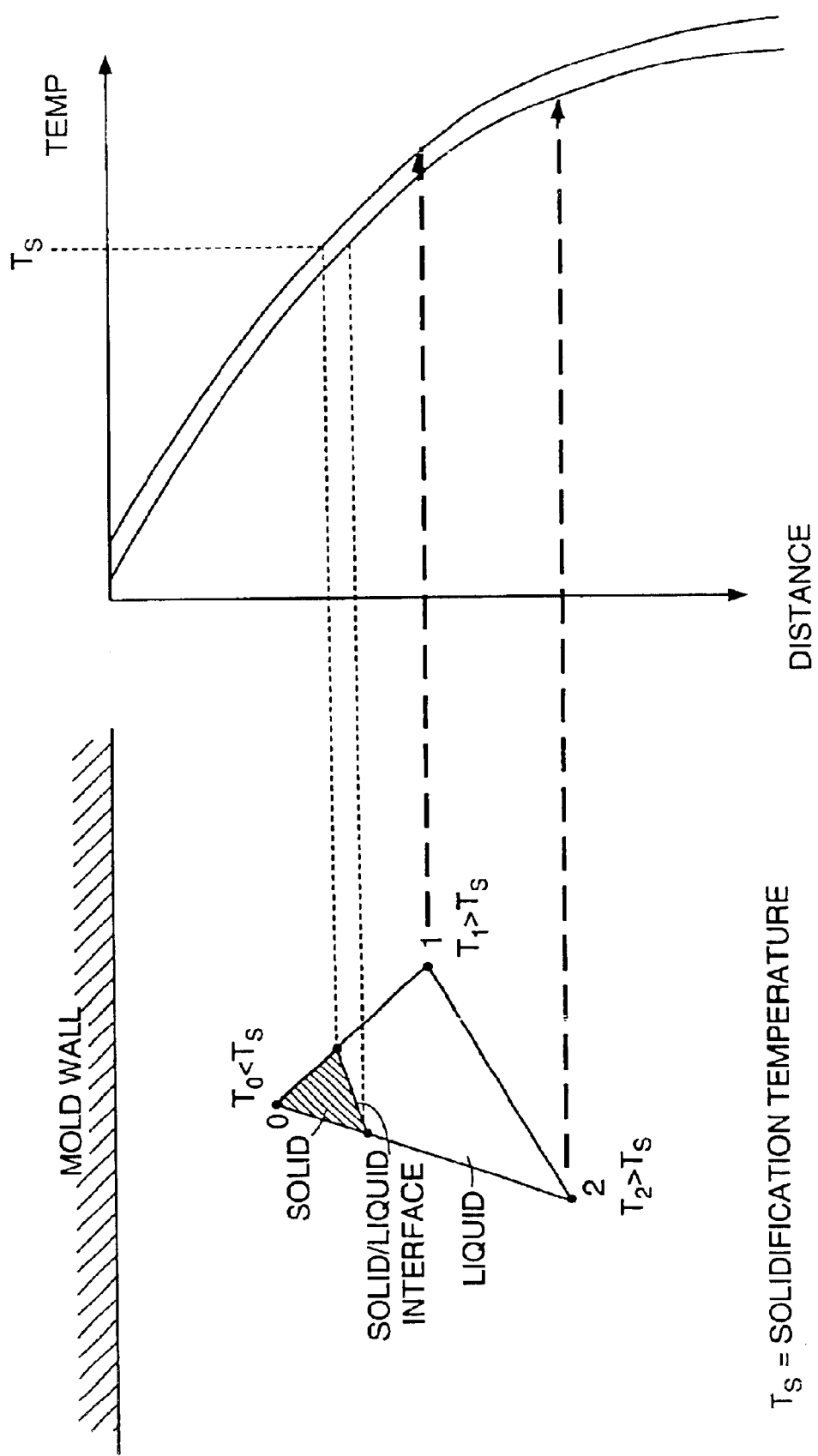
FIG. 19 is a schematic representation of a method for determining the solid/liquid interface position within an element using solidification temperature and a one dimensional analytic function for temperature distribution at each liquid node.

The process is represented schematically in FIG. 19. Again, for ease of depiction, two dimensional elements are used, but the innovative concept can be applied, without loss of generality, to three dimensional elements. The drawing shows the determination of the solid/liquid interface within an element using both the solidification temperature, $T_s$, and the one dimensional analytic functions for temperature distribution at each of the liquid nodes.

The next innovative methodology concerns the formulation of elements with a linear variation of material properties throughout each element. Much of common finite element practice results in a discretization of the domain, such that the field variables are computed at the node points, and the material properties required for analysis are constant within an element. While this technique may provide acceptable results in certain less rigorous applications, according to the invention, in applying the finite element method to fluid flow in injection molding, the equations are formulated such that both field variables (such as pressure, temperature, flow conductance and velocity) and material properties (such as viscosity) are defined at the nodes and are, unless otherwise stated, interpolated within an element according to the element shape function. Discretization in this way provides additional accuracy of computation, and has been found to be particularly advantageous for higher order, advanced interpolations.

For example, the equation for flow conductance given by Nakano, which makes use of the material property viscosity, can be re-written as:

$$\frac{\partial}{\partial x_k}\left(\eta \frac{\partial \kappa}{\partial x_k}\right) = -1 \quad (27)$$

where the subscript k is an index 1, 2, or 3 denoting each coordinate direction x, y, and z respectively.

Applying Galerkin Weighting integration over the element gives:

$$\int_{\Omega_e} \frac{\partial}{\partial x_k}\left(\eta^e \frac{\partial \kappa^e}{\partial x_k}\right) N_l d\Omega_e = -\int_{\Omega_e} N_l d\Omega_e \quad (28)$$

where the elemental flow conductance and viscosity respectively are given by:

$$\kappa^e = \sum_{j=1}^{4} \kappa_j N_j \quad (29)$$

$$\eta^e = \sum_{j=1}^{4} \eta_j N_j \quad (30)$$

and where $\Omega_e$ refers to the volume of an element, $N_1$ is the element shape function at each node in the element i, and the superscript e is an element index.

Applying the divergence theorem gives:

$$\int_{\Gamma_e} \eta^e \frac{\partial \kappa^e}{\partial x_k} n_k N_l d\Gamma_e - \int_{\Omega_e} \eta^e \frac{\partial \kappa^e}{\partial x_k} \frac{\partial N_l}{\partial x_k} d\Omega_e = -\int_{\Omega_e} N_l d\Omega_e \quad (31)$$

where $n_k$ is the normal vector at the element boundary $\Gamma$.

The first term is assumed to vanish during element assembly at internal element faces due to the equal and opposite contribution from adjacent elements. This is true, since element viscosity, which is based on an interpolation of nodal values, will be matched along the boundary between two adjacent elements. Further, the gradients of flow conductance are assumed to be equal on each side of the element boundary. Only the normal vector has an opposite sign in adjacent elements, which results in the contributions from adjacent elements negating to zero. At the cavity boundary in the filled region, the boundary integral is not needed when a known value boundary condition is applied ($\kappa$=0). However in the case where wall slip is required, so too is the boundary integral term. In either case the boundary integral term needs to be evaluated at the free surface boundary and at the injection boundary.

Equations (29) and (30), which demonstrate the linear variation of properties within an element, can be substituted into equation (31) giving:

$$-\int_{\Gamma_e} \eta_i N_i \frac{\partial N_j}{\partial x_k} n_k N_l \kappa_j d\Gamma_e + \int_{\Omega_e} \eta_i N_i \frac{\partial N_j}{\partial x_k} \frac{\partial N_l}{\partial x_k} \kappa_j d\Omega_e = \int_{\Omega_e} N_l d\Omega_e \quad (32)$$

It is known that the exact integral for a tetrahedron with natural co-ordinate shape functions is:

$$\int_{\Omega_e} N_l^\alpha N_j^\beta N_k^\gamma N_l^\delta d\Omega_e = \frac{\alpha! \beta! \gamma! \delta!}{(\alpha+\beta+\gamma+\delta+3)!} 6V \quad (33)$$

where:
$N_i$ is the shape function,
V is the volume of the element, and
$\alpha$, $\beta$, and $\gamma$, are integer exponents Using this integration relationship (33) with equation (32) gives:

$$\left(\sum_{f=1}^{4} (\delta_{fl} - 1)\left[\frac{A\sum_{i=1}^{3}(1+\delta_{il})\eta_l}{12}\frac{\partial N_j}{\partial x_k}n_k\right] + \left[\sum \frac{\eta_i V}{4}\frac{\partial N_j}{\partial x_k}\frac{\partial N_l}{\partial x_k}\right]\right)\kappa_j = \quad (34)$$

$$\frac{V}{4}$$

where the summation of viscosities in the boundary integral is only over the three nodes which form each face. For completeness, the integral is shown here on every face, f. The face numbering matches the number of the opposite vertex.

So it is shown how equation for flow conductance, which requires the material property viscosity, can be formulated as a finite element system with viscosity varying throughout each element according to the element shape function.

Figure 20:
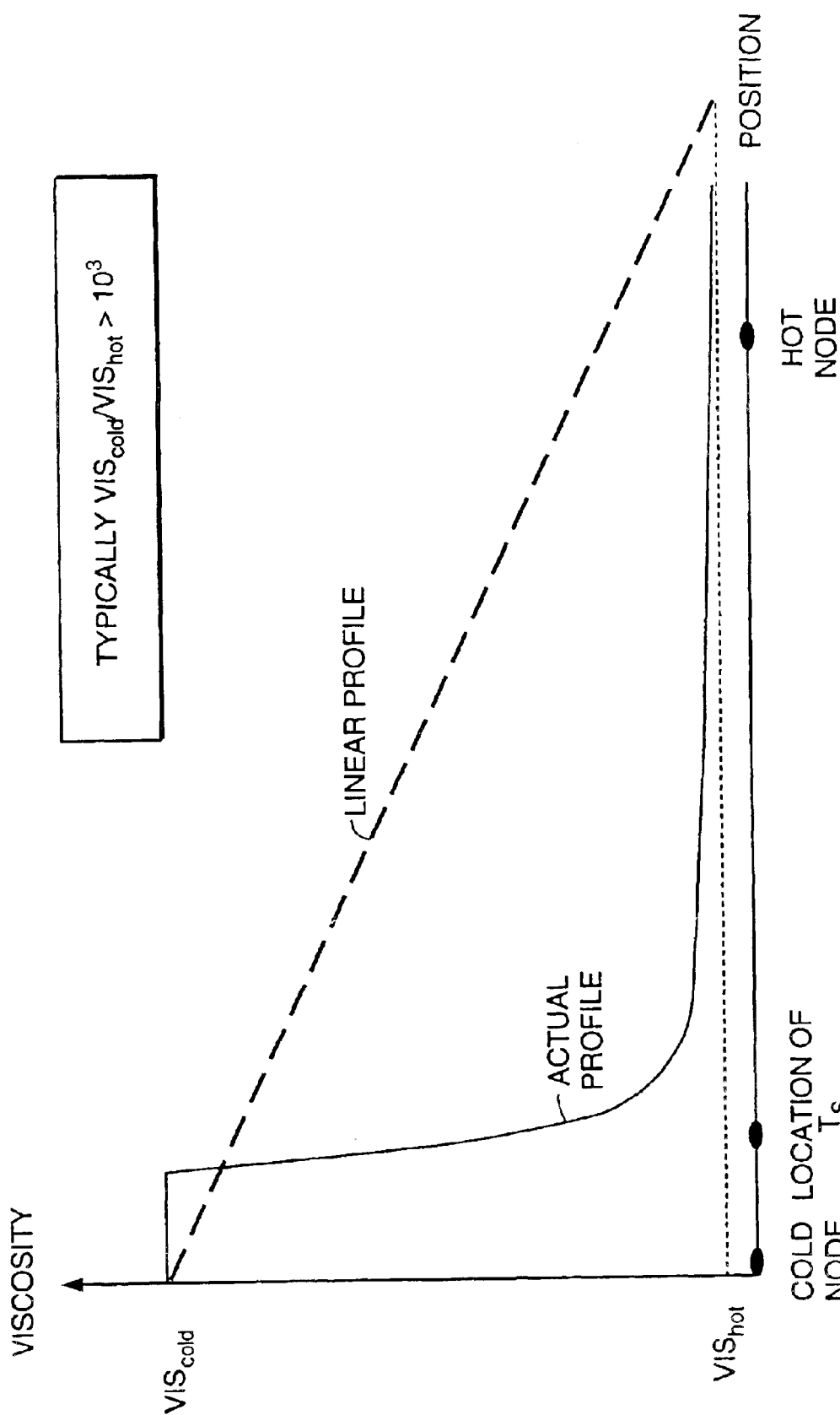
FIG. 20 is a schematic representation of the variation of viscosity within an element which contains a solid/liquid interface.

Still another area of innovation concerns the determination of an effective viscosity function in elements containing the solid/liquid interface. The most common partially-frozen elements occur adjacent to the mold wall, where they contain both "cold" wall nodes and "hot" internal cavity nodes. A linear variation of viscosity, which relies on the assumption of a linear variation of viscosity through elements, and arises from the use of elements with linear shape functions, usually over-estimates the effective viscosity of such elements, creating significant error in many cases, the most common and most serious being partially-frozen elements. See, for example, FIG. 20, which compares a linear viscosity profile with a more realistic, highly non-linear profile. This linear assumption leads to artificially high flow resistance in the simulation, reflected in injection pressures which can be more than 100% greater than reality. The approximation of linear viscosity variation is thus very poor in partially-frozen elements. While the error asymptotes to zero for a sufficiently fine mesh, this solution is not generally computationally practical or efficient. Accordingly, absent implementation of an effective viscosity function technique, simulation accuracy can suffer greatly.

According to one embodiment of the invention, greatly improved simulation accuracy of viscosity in partially-frozen elements entails calculating an effective viscosity. More specifically, the effective viscosity at each frozen node in an element that contains the solid/liquid interface can be computed and used locally during the element assembly procedure. As such, these nodal viscosities are transient, and do not replace the global values computed through a knowledge of the temperature and shear rate state at each node and the viscosity material function.

By labeling nodes above and below a predetermined solidification temperature, $T_s$, as "hot" and "cold" respectively, partially-frozen elements are defined as those which are not completely "hot" (i.e. all nodes designated "hot") or completely "cold" (i.e. all nodes designated "cold"). Cold nodes may be assigned an arbitrary large viscosity, that is, a viscosity value sufficiently large to ensure that no flow occurs in frozen portions. The solid state viscosity may be typically on the order of $10^6$ MPas. This technique gives a more realistic effective viscosity in partially-frozen elements. The viscosities of completely frozen or completely hot elements need not be modified.

Before addressing the specifics of one embodiment of the effective viscosity method, it may be helpful to provide an overview of some of the main features thereof. The modifications to viscosities can be made to any method for solving non-isothermal flow, including the method by Nakano, and more conventional Stokes and Navier-Stokes solutions. When shear heating is enabled, the appropriate viscosity modifications can be carried through related routines Additionally, the modifications are made during element assembly. For each element, the four local node viscosities are modified. Global node viscosities are not altered. Viscosities in elements whose nodes are all cold or all hot are not modified. The standard approximation of linear viscosity variation is still used for these elements.

The volume fraction of freeze in the element is used to calculate a volume fraction of freeze within each nodal volume. In this particular context, "freeze" is the portion of the volume below $T_s$ and nodal volume refers only to that part within the-current element. The mean viscosities, $vis_h$ and $vis_c$ of the hot and cold nodes in the element, respectively, are calculated and each nodal volume may contain a frozen and a molten portion, regardless of whether the node itself is hot or cold. The viscosity within the frozen portion is the nodal viscosity if the node is cold, and $vis_c$ if the node is hot. Similarly, the viscosity within the molten portion is the nodal viscosity if the node is hot, and $vis_h$ if the node is cold. Lastly, the effective viscosity of the entire nodal volume is then determined and applied locally to the node. The expression for effective viscosity was derived by determining the parallel flow resistance of the frozen and molten portions of the nodal volume, based on the assumption of flow parallel to the local freeze surface.

Table 1 lists the terms used in this-methodology, for ease of reference.

TABLE 1

| Variable | Definition |
|---|---|
| $T_s$ | Solidification temperature |
| nc | Number of nodes on element below $T_s$ |
| nh | Number of nodes on element above $T_s$ |
| tfroz | Volume fraction of freeze in element (freeze meaning below $T_s$) |
| frzc | Volume fraction of freeze in nodal volume of each cold node |
| frzh | Volume fraction of freeze in nodal volume of each hot node |
| $vis_i$ | Viscosity of element nodes (i = 1 to 4) - global values |
| $etet_i$ | Viscosity of element nodes (I = 1 to 4) - local values used for element assembly |
| $vis_c$ | Mean of global viscosities of nc cold nodes |
| $vis_h$ | Mean of global viscosities of nh hot nodes |

For each element, the following steps are followed to determine the local node viscosities, $etet_i$. Derivation of the equations is described hereinbelow. According to this embodiment of the method, first determine nc and nh. If nc=0 or nh=0, this is not a partially-frozen element. Set $etet_i=vis_i$ and proceed to the next element. Next, calculate $vis_c$ and $vis_h$. Then, calculate frzc and frzh in accordance with the following equations:

$$frzc = \text{Min}\left(\frac{4 \cdot tfroz}{nc}, 1\right) \quad (35)$$

$$frzh = \frac{4 \cdot tfroz - nc \cdot frzc}{nh} \quad (36)$$

Finally, loop over the four local nodes i and calculate the viscosity $etet_i$ of each. Use equation (37) if node i is cold, and equation (38) if node i is hot.

$$etet_i = \frac{vis_i vis_h}{(1-w)vis_i + w \cdot vis_h}, \quad w = \frac{frzc^{\frac{1}{3}}}{frzc^{\frac{1}{3}} + (1-frzc)^{\frac{1}{3}}} \quad (37)$$

$$etet_i = \frac{vis_i vis_c}{(1-w)vis_c + w \cdot vis_i}, \quad w = \frac{frzh^{\frac{1}{3}}}{frzh^{\frac{1}{3}} + (1-frzh)^{\frac{1}{3}}} \quad (38)$$

The quantities frzc and frzh are derived as follows. First, let the current element volume be V, so that the four nodal volumes are each V/4. The volume of freeze in the element is V*tfroz. By approximating that the freeze volume is distributed evenly between the cold nodes, nc, there is a volume V*tfroz/nc of freeze in each nodal volume. Since this freeze volume cannot be greater than the nodal volume, the actual freeze volume is the minimum of V*tfroz/nc and V/4, ie. Min(V*tfroz/nc, V/4). Converting this to a volume fraction yields equation (35), namely:

$$frzc = \text{Min}\left(\frac{4 \cdot tfroz}{nc}, 1\right) \tag{35}$$

Any freeze "left over" or remaining after distribution to the cold nodes is distributed evenly to the hot nodes, nh. The freeze volume assigned to cold nodes is V*nc*frzc/4, so the remaining freeze volume is V*tfroz−V*nc*frzc/4. Dividing this between the hot nodes, nh, and converting to a volume fraction yields equation (36), namely:

$$frzh = \frac{4 \cdot tfroz - nc \cdot frzc}{nh} \tag{36}$$

Figure 21:
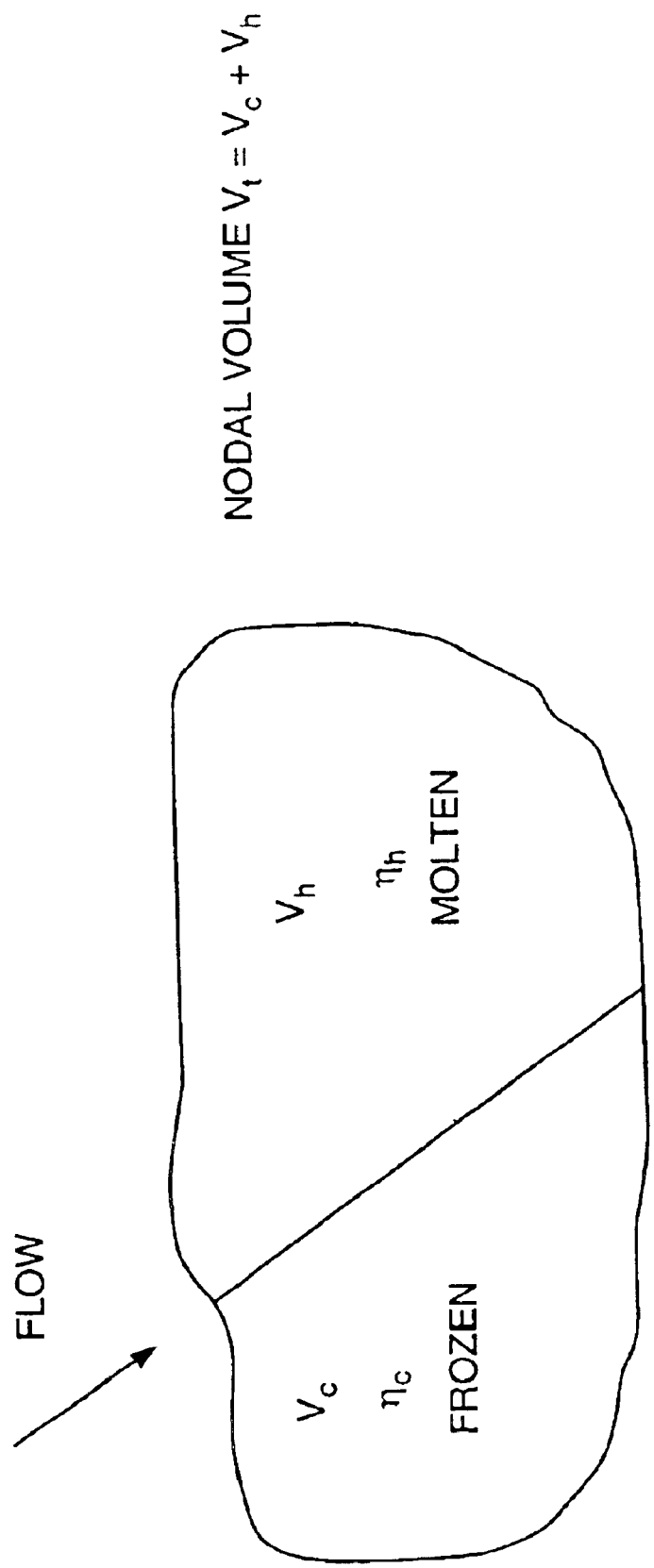
FIG. 21 is a schematic representation of fluid flow in the vicinity of a solid/liquid interface.

The local node viscosities are derived as follows. Let the nodal volume be $V_t$. Assuming the volume is partially frozen, the total volume is divided into a cold volume, $V_c$, and a hot volume, $V_h$, with respective viscosities $\eta_c$ and $\eta_h$. Obviously, $V_t = V_c + V_h$. Also, the local flow should be parallel to the local freeze surface in the nodal volume. FIG. 21 depicts this situation schematically. While the figure is in two dimensions, the drawing is representative of three dimensions.

The next step is to determine the effective viscosity of the entire nodal volume $V_t$ in the flow direction. The effective viscosity normal to the flow does not affect the flow solution. Call this effective viscosity $\eta_t$. Exact calculation of $\eta_t$ tends to be impractical for odd-shaped volumes in the model, requiring complex volume integrations. Instead, a simplified approach can be used which gives the correct behavior as each nodal volume freezes.

Now, the flow resistance R of some volume with uniform viscosity $\eta$ is proportional to $\eta L/A$, where L is the path length through the volume in the flow direction and A is the cross-sectional area normal to the flow direction. The flow resistance of the nodal volume is given by $1/R_t = 1/R_c + 1/R_h$. Calculating L/A for each volume is generally not feasible. Instead, note that L/A has the dimensions of 1/length, so approximate that l/A varies as volume$^{-1/3}$. Therefore, the following relationship applies:

$$\frac{V_t^{\frac{1}{3}}}{\eta_t} = \frac{V_c^{\frac{1}{3}}}{\eta_c} + \frac{V_h^{\frac{1}{3}}}{\eta_h} \tag{39}$$

from which can be obtained:

$$\eta_t = \frac{\eta_c \eta_h V_t^{\frac{1}{3}}}{\eta_h V_c^{\frac{1}{3}} + \eta_c V_h^{\frac{1}{3}}} \tag{40}$$

Let the frozen fraction in the nodal volume be F, where F is frzc or frzh, depending on whether the node is cold or hot.

Then $V_c = FV_t$ and $V_h = (1-F)V_t$. Substituting into equation (40) yields:

$$\eta_t = \frac{\eta_c \eta_h}{\eta_h F^{\frac{1}{3}} + \eta_c (1-F)^{\frac{1}{3}}} \tag{41}$$

Equation (41) may be normalized. For example, if $\eta_c = \eta_h$, equation (41) should reduce to $\eta_t = \eta_c$. Accordingly modify equation (41) to:

$$\eta_t = \frac{\eta_c \eta_h \left[F^{\frac{1}{3}} + (1-F)^{\frac{1}{3}}\right]}{\eta_h F^{\frac{1}{3}} + \eta_c (1-F)^{\frac{1}{3}}} \tag{42}$$

The final question is what viscosity to use in the two portions of the nodal volume. If the node i associated with the nodal volume is cold, use $\eta_c = vis_i$ and approximate that $\eta_h = vis_h$. Similarly, if node i is hot, use $\eta_h = vis_i$ and approximate that $\eta_c = vis_c$. The final equation for etet$_i$ is then equation (37) or equation (38) according to whether the node i is cold or hot.

The behavior of equation (42) is correct in limiting cases. For example, if F=0, $\eta_t = \eta_h$ as required. Similarly, if F=1, $\eta_t = \eta_c$ as required. Also, the variation of $\eta_t$ with F is smooth and monotonic. If $\eta_c = \eta_h$, $\eta_t = \eta_c$ as required. Lastly, when $\eta_c \gg \eta_h$, $\eta_t \approx \eta_h[1+(F/1-F)^{1/3}]$. This has the correct form, as $\eta_t$ increases with F from a value of $\eta_h$ at F=0.

Two simpler expressions in place of equation (42) can be used, if desired; however, they may result in less accurate predictive behavior. One expression is as follows:

$$\eta_t = \eta_c F + \eta_h (1-F) \tag{43}$$

One issue with equation (43) is that in the typical case that $\eta_c \gg \eta_h$, the equation yields $\eta_t \approx \eta_c F$. Effectively, since $\eta_c$ is very large, this equation predicts there is no flow through the node, even when most of the node volume is molten. Correspondingly, the predicted injection pressures tend to be larger than expected.

The second expression is as follows:

$$\eta_t = \frac{\eta_c \eta_h}{\eta_h F + \eta_c (1-F)} \tag{44}$$

This equation does give the correct behavior in limiting cases, like equation (42). Namely if F=0, $\eta_t = \eta_h$ as required. If F=1, $\eta_t = \eta_c$ as required. The variation of $\eta_t$ with F is smooth and monotonic. If $\eta_c = \eta_h$, $\eta_t = \eta_c$ as required. Lastly, when $\eta_c \gg \eta_h$, $\eta_t \approx \eta_h[1+(F/1-F)]$. This has the correct form, as $\eta_t$ increases with F from a value of $\eta_h$ at F=0.

There are two issues, however, with equation (44). Firstly, equation (44) is derived by assuming flow resistance proportional to $\eta/V$, rather than $\eta/V^{1/3}$ as for equation (42). The underlying assumption is therefore dimensionally incorrect. Secondly, in practice, equation (42) has been demonstrated to predict injection pressures closer to the correct values. For a tube model test case, with an expected injection pressure of 0.62 MPa, 6-layer Darcy models gave pressures of 0.47 MPa using equation (44), compared to 0.51 MPa using equation (42). Sixteen-layer models gave pressures of 0.56 MPa and 0.55 MPa respectively. A linear viscosity formulation gave pressures of 1.59 MPa and 0.63 MPa with 6 and 16 layer refinement.

Testing of the effective viscosity methodology has shown that the value of tfroz is relatively accurate. Further, while the present method employs equal distribution of tfroz to the "cold" nodes, an alternative approximation would be to weight the distribution by the element nodal temperatures. Yet another would be to directly calculate frzc by interpolating the $T_s$ surface through each nodal volume and calculating volumes. A similar technique could be employed for the equal distribution of remaining freeze to the "hot" nodes, although these alternatives could consume additional computing resources.

While the use of $F^{1/3}$ and $(1-F)^{1/3}$ weightings for cold and hot region viscosities are based upon empirical weightings, with additional qualitative theoretical support, it is contemplated that the weightings could be based on integration over partial nodal volumes. Additionally, the use of mean hot node viscosity for the hot region of a cold node may tend to underestimate the hot region viscosity, since viscosity increases as the freeze surface is approached. This, in turn, may result in a slight underestimation of injection pressure, as noted hereinabove. The use of mean cold node viscosity for the cold region of a hot node, however, has been determined to produce negligible error, since $vis_c$ simply needs to be sufficiently large to eliminate flow through the frozen portion.

Now, with respect to the technique of elimination of frozen nodes and elements from the solution domain, at some stage during filling and/or packing, whole elements are rendered substantially immobile by virtue of the fact that the temperature of all nodes in the element has fallen below the solidification temperature, $T_s$. The question is how to treat these elements within the context of fluid flow analysis. One approach is to continue to treat these elements as a fluid by considering the solid region as a zone of very high viscosity. The "solid" viscosity can be obtained by extrapolating the fluid viscosity function, or by assigning an arbitrarily large value. This, however, this can lead to ill-conditioning of the system of equations. Convergence can be retarded, or stopped completely, and the computational cost increased thereby.

In accordance with one embodiment of the invention, the solution domain for the flow conductance and pressure is reduced to include only those elements which have some nodes above the solidification temperature. By removing completely frozen elements from the solution domain, ease of convergence for an essentially fluid problem is achieved, while a saving in computation time is also gained. The useful boundary conditions for no-slip flow are applied at the boundary with the frozen region, rather than at the mold wall. In the early phases of the molding process, these two boundaries are coincident. These boundary conditions are applied by setting the flow conductance function to be zero at the boundary. Note that the full cavity domain is typically used for the temperature field calculations.

Still another innovative methodology entails computation of the effective pressure in regions that have solidified. Having chosen to characterize the material in the mold cavity as either solid or liquid, it is still generally desirable to compute the pressure in the solid. In reality, the frozen polymer still experiences a pressure influence, since compressive stress and small deflections can be transmitted by the solid polymer from the neighboring molten polymer over small distances. In order to assign a pressure to the frozen nodes, it is generally not sufficient to propagate pressure from molten nodes, because this method does not allow for the process of freeze-off, where some sections of the filled cavity can still be molten and subjected to injection pressure, while at the same time other regions are frozen and have no applied pressure because they are at such a distance from the molten regions that no meaningful pressure transmission is effected.

Also, it is desirable to know the pressure in order to establish the state of the material. The pressure is used along with a knowledge of temperature to establish material density and, consequently, mass at each node, solid or liquid, within the cavity.

Further, it is reasonably common for manufacturers to flush mount pressure sensors within actual mold cavities in order to provide some information by which they can control molding machines and processes, and attempt to establish parameters related to molded part quality. Consideration of the actual physics of the process leads one to conclude that a precise simulation likely would require a very complex and computationally expensive multi-physics simulation, combining both fluid dynamics and solid mechanics. At this time, however, the techniques are not well established.

One solution, in accordance with the invention, has been to develop a technique for estimating solid pressure by projecting core pressure onto the outer cavity frozen layer. More specifically, in both frozen and molten regions, the core pressure is projected onto any outer nodes which are frozen. By way of example, the core pressure may be determined from the normal fluid finite element method calculation, or it may be from the pressure decay of the frozen solid material, which progresses as the temperature of the polymer decreases due to cooling. By a process of geometry decomposition, all nodes which are not in the core of a part are assigned a core node, whose pressure they will mimic once frozen. The only nodes for which pressure decay during cooling is actually calculated then, are those which are given the core attribute. Each outer node may be assigned the core node which is closest to it to be its core node. However, the algorithm for determining which nodes are core nodes actually relies on the outer nodes. That is, every core node has at least one outer node which depends on it; otherwise, the core node would not have been given the core node attribute.

The algorithm for generating the core node attribute is as follows. First, label all nodes on the cavity wall as layer zero. Then, label all nodes adjacent to layer zero as layer one. Next, label all nodes adjacent to layer one as layer two, and repeat with successively increasing layer numbers until all nodes are assigned a layer number. Thereafter, calculate the distance to the nearest cavity wall for every node. Also, record which is the closest cavity wall node for each internal node. All nodes whose layer number is greater than or equal to half the guaranteed number of layers through the thickness are marked as potential core nodes.

The guaranteed number of layers through the thickness is a result of the mesh refinement process described earlier. Now, continue by starting with each node on the cavity wall, that is, with layer number zero. Traverse the nodes connected to each in turn, moving to successively higher layer numbers, until such time as a potential core node is reached. In general, there will be several potential core nodes for each cavity wall node.

The node that is selected as the core node associated with the wall node is that which maximizes the ratio $d_{cw}/d_{cn}$, where:

$d_{cw}$ is distance of core node to cavity wall, and $d_{cn}$ is distance of core node to wall node.

Internal nodes that are not core nodes are assigned a core node that is the same as the closest cavity wall node, determined during the previous layer numbering steps.

This algorithm has the feature that when a thin and thick region are adjacent to each other, the frozen nodes in the thin region will have a core pressure from the thick region assigned to them. This has been found to mimic the real physical process well. For example, where a narrow gate is attached to a thicker runner feed system, after the gate has frozen, the pressure reported on it mimics that of the thicker feed system. This represents the transmission of compressive stresses through the solid polymer.

Figure 22:
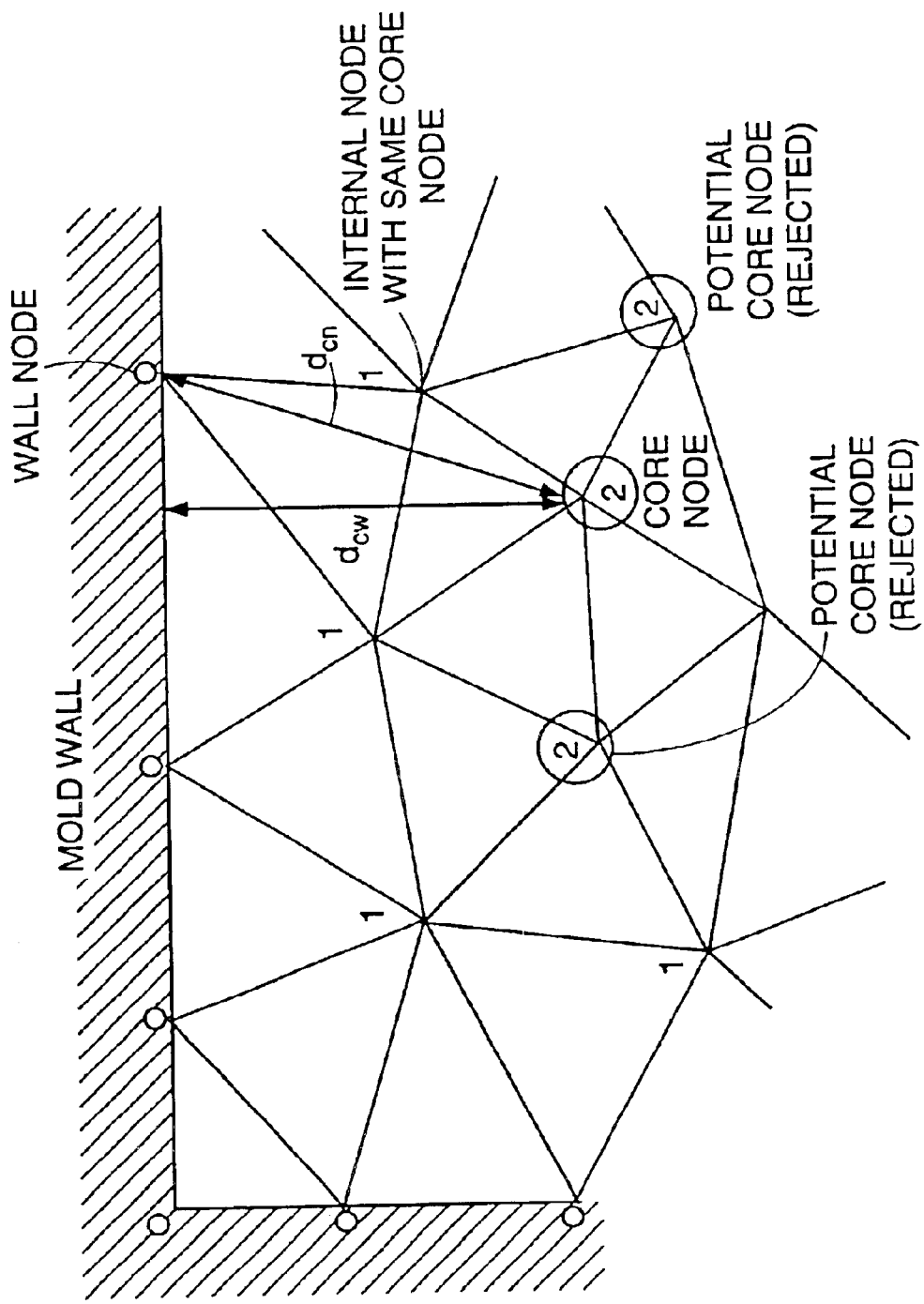
FIG. 22 is a schematic representation of a method for determining a core node associated with each wall node and each internal node.

FIG. 22 shows layer numbering for core, wall, and internal nodes and the definition of the distances used in the ratio to establish which core node is assigned to each wall node.

Figure 23A:
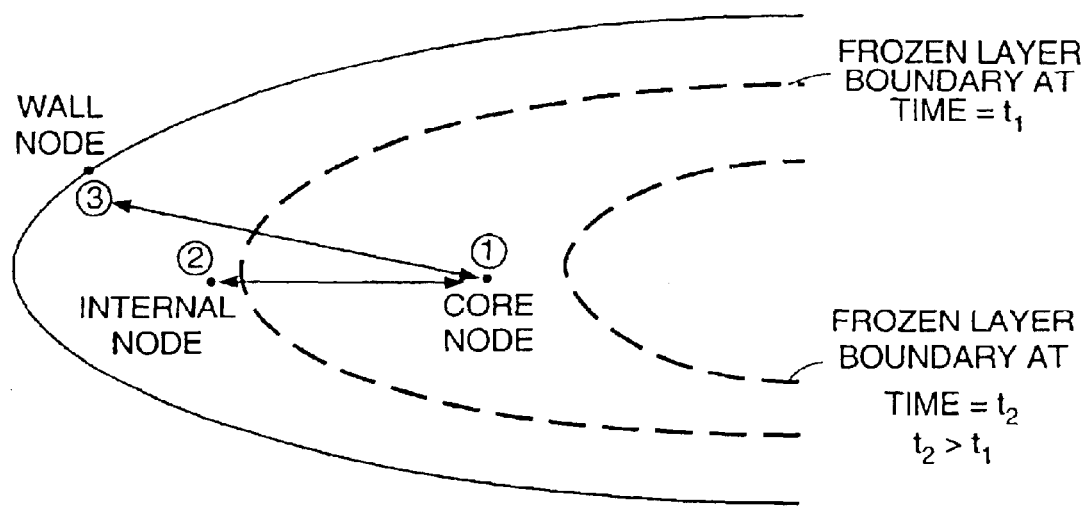
FIGS. 23A through 23C are schematic representations of the relationship between wall, internal, and core nodes, and a method for determining pressure at frozen nodes.
Figure 23B:
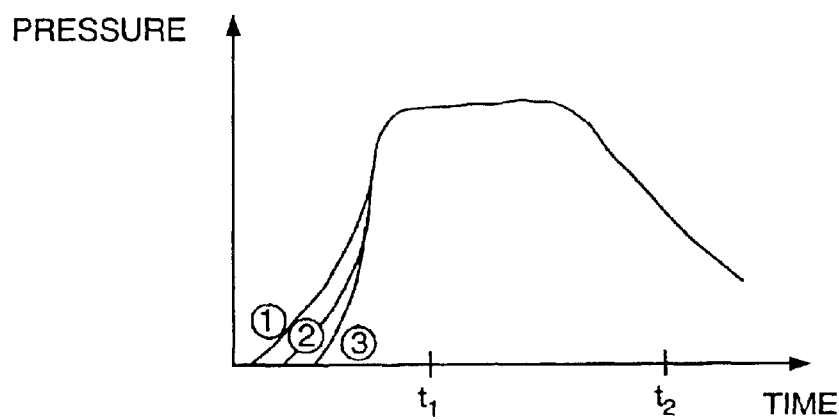
Figure 23C:
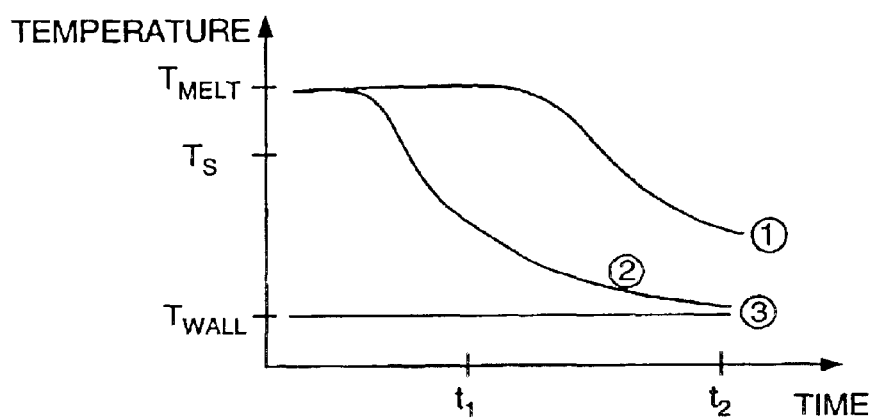

FIGS. 23A through 23C shows the relationship between core nodes, wall nodes and internal nodes, and their change in pressure with increasing time and freezing.

Having described the various innovative methodologies and algorithms in detail, attention can now be turned to FIGS. 24 and 25 for an understanding of how the improvements are implemented in both the filling phase and packing phase, in accordance with one embodiment of the invention. FIG. 24 is a schematic representation of the filling phase analysis summarizing certain process substeps of step 50 from FIG. 2. Recall, that according to the top level flowchart of FIG. 2, once the three dimensional solid model has been discretized to provide a model solution domain and the boundary conditions have been set, the simulation first solves for filling phase process variables in step 50.

The filling phase analysis of step 50 begins with the assumption that the cavity is empty in step 110. All field variables, such as pressure, temperature, and velocity, are initialized in step 120. Thereafter, conservation of mass and conservation of momentum equations are applied to solve for fluidity, κ, in step 130 and pressure in step 140 and calculate velocity in step 150, for at least a portion of the solution domain. In the case where a finite element analysis is being used, the fluidity, pressure, and velocity values are determined at each of the nodes in the mesh.

Fluidity can be solved by application of the Darcy flow equation and pressure then solved using a Laplace equation, because pressure is a function of the fluidity. Alternatively, a Navier-Stokes technique can be used to solve for pressure, based on conservation of momentum. Once fluidity and pressure have been solved, velocity can be calculated directly. Next, based on conservation of energy principles, temperature is used to calculate viscosity in step 160. Then, in step 170, the model checks to see if pressure has converged, which is likely not the case initially. If not, steps 130 through 160 are repeated iteratively, until pressure converges.

Once pressure has converged, the simulation incrementally advances the fluid flow front in free surface evolution step 180. The contribution of convective heat transfer is next considered in step 190, in which an explicit Lagrangian temperature analysis is completed to account for the thermal energy effects of the continuing inflow of molten polymer in the cavity. Then, the remaining terms in the temperature equation are solved in step 200, to account for conduction, viscous dissipation, and any other thermal effects desired, such as heat of solidification in thermoplastics and heat of reaction in thermosetting materials.

Once all of the temperature effects have been quantified and integrated into the simulation, the algorithm checks to see if the mold cavity is full in step 210. If not, steps 130 through 200 are repeated, iteratively, until such time as the cavity is full. In general, the algorithm may loop on the order of 100 to 200 times to simulate filling of the mold cavity. Upon completion, the model then proceeds to step 60, depicted in the flowchart in FIG. 2, wherein the packing phase analysis is performed.

Referring now to FIG. 25, depicted is a schematic representation of the packing phase analysis summarizing certain process substeps of step 60 from FIG. 2. The packing phase analysis of step 60 begins with the initial state of all variables resulting from the filling phase, step 50. Once again, conservation of mass and conservation of momentum equations are applied to solve for fluidity, κ, in step 220 and pressure in step 230 and calculate velocity in step 240, for at least a portion of the solution domain. Once fluidity and pressure have been solved, velocity can be calculated directly. Next, based on conservation of energy principles, temperature is used to calculate viscosity in step 250. Then, in step 260, the model checks to see if pressure has converged, which is likely not the case initially. If not, steps 220 through 150 are repeated iteratively, until pressure converges.

Once pressure has converged, the contribution of convective heat transfer is next considered in step 270, in which the explicit Lagrangian temperature analysis is completed to account for the reduced, but continuing inflow of molten polymer in the cavity. Then, the remaining terms in the temperature equation are solved in step 280, to account for conduction, viscous dissipation, and any other thermal effects.

Once all of the temperature effects have been quantified and integrated into the simulation, component properties such as density, volumetric shrinkage, mass, and frozen volume are calculated and updated in step 290. Thereafter the algorithm checks to see if the prescribed pressure profile has been completed in step 300. If not, steps 220 through 290 are repeated, iteratively, until such time as the pressure profile is complete. Upon completion, the model then proceeds to step 70, depicted in the flowchart in FIG. 2, wherein the results of the simulation are output for consideration by the design engineer.

While many of the steps in the filling phase and packing phase flowcharts are similar, the respective contributions to the predictive accuracy of the overall simulation vary, especially with respect to application of the principles of conservation of energy. For example, during the filling phase where there exists relatively high flow rates, viscous dissipation thermal effects can be significant; whereas, during the packing phase, where there exists relatively low flow rates, the contributions of conduction and convection dominate the heat transfer analysis.

With regard to the numerous methodologies discussed hereinabove related to the principles of conservation of energy for improving predictive accuracy of the model, according to one embodiment of the invention, the following techniques may be implemented advantageously in step 190 of the filling phase flowchart: the use of a one dimensional analytic function to describe the local temperature distribution at a node; the definition of the variation of a one dimensional analytic function, with time, to account for heat convection; the description of an explicit temperature convection scheme using the one dimensional analytic function; and finite element mesh refinement, including a distance to the cavity wall computation algorithm. The description of the variation of a one dimensional analytic function to account for viscous heat generation may be implemented in step 200. These techniques could also be implemented in corresponding steps in the packing phase flowchart; however, their influence in the simulation results would be to a lesser degree, due to the different conditions.

Similarly, with respect to the innovative methodologies related to treatment of the solidified material, the following techniques may be implemented advantageously in step 220 of the filling phase flowchart in solving for fluidity: the determination of the position of the solid/liquid interface; the formulation of elements with a linear variation of material properties throughout; and the determination of an effective viscosity function in elements containing the solid/liquid interface. The elimination of frozen nodes and elements from the solution domain and the computation of the effective pressure in regions that have solidified may be implemented effectively in step 200 to facilitate solving for pressure. These techniques could also be implemented in corresponding steps in the filling phase flowchart; however, their influence in the simulation results would be to a lesser degree.

While there has been described herein what are considered to be exemplary and preferred embodiments of the invention, other modifications and alternatives of the invention will be apparent to those skilled in the art from the teachings herein. All such modifications and alternatives are considered to be within the scope of the invention. For example, while the disclosure has been generally directed to the modeling of thermoplastic injection molding, the teachings of the invention are applicable to injection molding of thermosetting polymers. As mentioned above, in such simulations, the contribution of the heat of reaction may be considered in the conservation of energy analysis, as can the heat of solidification in the thermoplastic model. Other heat transfer and thermal energy considerations can be integrated into the analysis, such as the thermal capacitance of the mold and active cooling or heating of the mold.

The general principles underlying the teachings herein may also be applied to modeling flows of different materials simultaneously or sequentially in the same mold, as well as modeling of other materials and fluids. For example, some or all of the principles of the invention presented herein could be applied to other molding processes. This could include polymer processes such as extrusion, blow molding, compression molding, thermoforming, and injection molding variants such as gas assisted injection molding, compression injection molding, and co-injection molding. Moreover, the principles could also be applied to manufacturing processes in other industries such as metal casting and food processing, namely, anywhere where a fluid, or a substance which behaves like a fluid, flows.

Accordingly, what is desired to be secured by Letters Patent is the invention as defined and differentiated in the following claims and equivalents thereof.

We claim:

1. A method for modeling injection of a fluid into a mold defining a three dimensional cavity, the method comprising the steps of:
   (a) providing a three dimensional computer model defining a cavity;
   (b) discretizing a solution domain based on the model;
   (c) specifying boundary conditions; and
   (d) solving for process variables using conservation of mass, conservation of momentum, and conservation of energy equations for at least a portion of the solution domain, wherein step (d) comprises the substep of using an explicit scheme in solving the conservation of energy equation and wherein the explicit scheme comprises a thermal clock that varies locally and may proceed differently than a global clock.

2. The method according to claim 1, wherein the explicit scheme is an explicit temperature convection scheme.

3. The method according to claim 1, wherein the explicit scheme comprises a one dimensional analytic function, data derived from a one dimensional analytic function, or a discrete function describing the temperature distribution about a node.

4. The method according to claim 1, wherein the thermal clock is a node thermal clock.

5. The method according to claim 1, wherein step (d) comprises the substep of calculating a Peclet number to estimate relative contributions of convection and conduction to heat transfer at a node.

6. The method according to claim 1, wherein step (d) comprises determining temperature at an upstream position corresponding to a particle location at a previous time step.

7. The method according to claim 1, wherein step (d) comprises the substep of calculating contribution to heat transfer due to at least one of viscous dissipation, heat of compression, heat of decompression, heat of solidification, and heat of reaction.

8. A method for modeling injection of a fluid into a mold defining a three dimensional cavity, the method comprising the steps of:
   (a) providing a three dimensional computer model defining the cavity;
   (b) discretizing a solution domain based on the model;
   (c) specifying boundary conditions; and
   (d) solving for process variables using conservation of mass, conservation of momentum, and conservation of energy equations for at least a portion of the solution domain, wherein:
      step (b) comprises the substep of generating a finite element mesh based on the model by subdividing the model into a plurality of connected elements defined by a plurality of nodes;
      step (d) comprises the substep of determining a location of a solid/liquid interface, the determination of the interface comprising the substep of determining locations at which a process variable achieves a given value; and
      step (d) further comprises the substep of removing from the solution domain nodes corresponding to elements which contain no unfrozen material.

9. The method according to claim 8, wherein the process variable of step (d) which is used to determine a location of a solid/liquid interface is one of the group consisting of temperature, velocity, and a process variable combining temperature and velocity.

10. The method according to claim 8, wherein step (d) further comprises the substep of determining an effective viscosity for each of a plurality of elements containing the solid/liquid interface by calculating a volume fraction of freeze within the element.

11. The method according to claim 8, wherein step (d) further comprises the substep of determining an effective pressure at a position in the solution domain by identifying core nodes within the solution domain.

12. The method according to claim 8, wherein step (d) further comprises the substep of projecting a core pressure onto an outer cavity frozen layer.

13. A molded plastic component formed from a process developed using the method of at least one of claims 1 and 8.

14. The method according to claim 8, wherein step (d) further comprises the substep of describing linear variation of a process variable throughout each of a plurality of elements.

15. The method according to claim 8, wherein step (d) further comprises the substep of using a one dimensional analytic function to describe variation of a process variable about a point.

16. An apparatus for modeling injection of a fluid into a mold defining a three dimensional cavity, the apparatus comprising:
   a memory for storing code that defines a set of instructions; and a processor for executing said set of instructions to:

(a) discretize a solution domain based on a three dimensional computer model defining a cavity; and (b) solve for process variables using conservation of mass, conservation of momentum, and conservation of energy equations, wherein an explicit scheme is used to solve the conservation of energy equation and wherein the explicit scheme comprises a thermal clock that varies locally and may proceed differently than a global clock.

17. The apparatus of claim 16, wherein the explicit scheme is an explicit temperature convection scheme.

18. The method according to claim 1, wherein step (d) comprises solving for fluidity over at least part of the solution domain.

19. The method according to claim 1, wherein step (d) comprises using a formulation derived from the conservation of mass and conservation of momentum equations.

20. The method according to claim 1, wherein step (d) comprises using at least one of a Nakano formulation, a Stokes formulation, and a Navier-Stokes formulation to solve for fluidity over at least part of the solution domain.

21. The method according to claim 8, wherein step (d) comprises solving for fluidity over at least part of the solution domain.

22. The method according to claim 8, wherein step (d) comprises using a formulation derived from the conservation of mass and conservation of momentum equations.

23. The method according to claim 8, wherein step (d) comprises using at least one of a Nakano formulation, a Stokes formulation, and a Navier-Stokes formulation to solve for fluidity over at least part of the solution domain.

24. An apparatus for modeling injection of a fluid into a mold defining a three dimensional cavity, the apparatus comprising:

a memory for storing code that defines a set of instructions; and a processor for executing said set of instructions to:

(a) discretize a solution domain based on a three dimensional computer model defining a cavity;

(b) generate a finite element mesh based on the model by subdividing the model into a plurality of connected elements defined by a plurality of nodes;

(c) solve for process variables using conservation of mass, conservation of momentum, and conservation of energy equations for at least a portion of the solution domain;

(d) determine a location of a solid/liquid interface by determining locations at which a process variable achieves a given value; and (e) remove from the solution domain nodes corresponding to elements which contain no unfrozen material.

* * * * *